(12) United States Patent
Girouard et al.

(10) Patent No.: US 6,491,125 B2
(45) Date of Patent: Dec. 10, 2002

(54) SNOWMOBILE WITH PIVOTABLE REAR SNOW FLAP

(75) Inventors: Bruno Girouard, Montréal (CA); Berthold Fecteau, Richmond (CA); Jérôme Wubbolts, Orford (CA); Eric Bertrand, Sherbrooke (CA)

(73) Assignee: Bombardier Inc., Valcourt (CA)

( * ) Notice: Subject to any disclaimer, the term of this patent is extended or adjusted under 35 U.S.C. 154(b) by 0 days.

(21) Appl. No.: 09/877,213

(22) Filed: Jun. 11, 2001

(65) Prior Publication Data

US 2002/0027028 A1 Mar. 7, 2002

Related U.S. Application Data

(63) Continuation-in-part of application No. 09/472,134, filed on Dec. 23, 1999, and a continuation-in-part of application No. 09/472,133, filed on Dec. 23, 1999, now abandoned.
(60) Provisional application No. 60/252,404, filed on Nov. 22, 2000, and provisional application No. 60/167,614, filed on Nov. 26, 1999.

(30) Foreign Application Priority Data

Dec. 23, 1998 (CA) .............................................. 2256944

(51) Int. Cl.[7] .............................................. B62M 27/02
(52) U.S. Cl. ........................ 180/190; 280/247; 280/900
(58) Field of Search .................................. 180/182, 186, 180/190, 191, 192, 193–196, 9.5, 9.54, 847, 849, 851, 157, 156, 854; 280/900, 809; 293/103

(56) References Cited

U.S. PATENT DOCUMENTS

| 3,583,506 A | 6/1971 | Preble |
| 3,583,507 A | 6/1971 | Trautwein |
| 3,622,196 A | 11/1971 | Sarra |
| 3,627,073 A | 12/1971 | Grimm |
| 3,981,373 A | 9/1976 | Irvine |

(List continued on next page.)

FOREIGN PATENT DOCUMENTS

| CA | 2251769 | | 8/1995 |
| JP | 56082674 A | * | 7/1981 |
| JP | 06199255 | * | 7/1994 |

OTHER PUBLICATIONS

Info Magazine Article: Dirt Wheels/Jan. 1991.
Brochure of Yamaha Snow Scout: Snowmobile Brochure Business, 3rd Annual.
Magazine Supertrax/Jan. 1999.
Snow tech, Spring 1999, Article "Special Report" Redline Snowmobiles, pp. 28–31.
Montoneige Quebec, vol. 25–NO. 3, Nov. 1999, pp. 1 (front cover), 6, 31 and 58.
Creations J.P.L. Inc. Advertisement (advertising seat designs).

*Primary Examiner*—Anne Marie Boehler
(74) *Attorney, Agent, or Firm*—Pillsbury Winthrop LLP

(57) ABSTRACT

A snowmobile includes a chassis having a generally reduced length and a snow flap pivotally attached to the rear portion of the chassis, above the track system. The track system extends rearwardly beyond the chassis, and the snow flap shields the track system above and behind from spraying snow. The snow flap is linked to the track system so that as the track system moves through a range of travel relative to the chassis, the snow flap pivots relative to the chassis with the track system. This configuration prevents damaging contact between the tread and the undersurface of the snow flap and/or the chassis. The reduced length of the chassis decreases the weight of the snowmobile and the polar moment of inertia, thereby improving turning performance. A bumper extends from the snow flap and can be used to lift the rear of the snowmobile more easily.

11 Claims, 21 Drawing Sheets

U.S. PATENT DOCUMENTS

| | | |
|---|---|---|
| 4,204,581 A | 5/1980 | Husted |
| 4,204,582 A | 5/1980 | Van Soest |
| 4,418,782 A * | 12/1983 | Nakazima .................. 180/190 |
| 4,421,193 A * | 12/1983 | Bissett ...................... 180/192 |
| 4,502,560 A | 3/1985 | Hisatomi |
| 4,613,006 A | 9/1986 | Moss et al. |
| 4,633,964 A | 1/1987 | Boyer et al. |
| 4,699,229 A | 10/1987 | Hirose et al. |
| 4,848,503 A | 7/1989 | Yasui et al. |
| 5,370,198 A | 12/1994 | Karpik |
| 5,474,146 A | 12/1995 | Yoshioka et al. |
| 5,564,517 A | 10/1996 | Levasseur |
| 5,611,572 A | 3/1997 | Alava |
| 5,660,245 A | 8/1997 | Marier et al. |
| 5,944,133 A | 8/1999 | Eto |
| 6,234,263 B1 | 5/2001 | Boivin et al. |

* cited by examiner

FIG_5

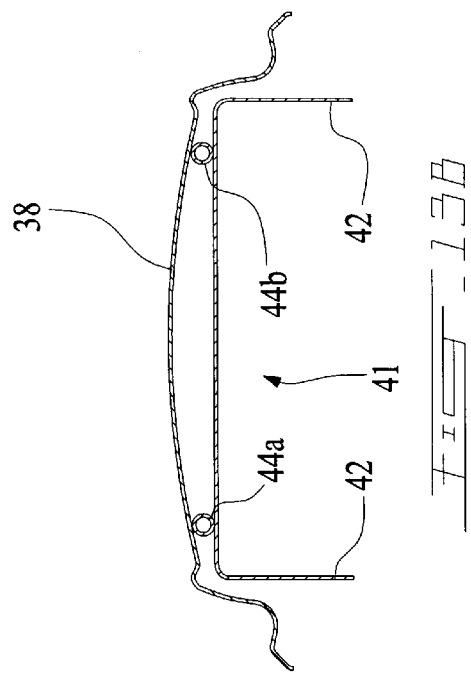
FIG_13B
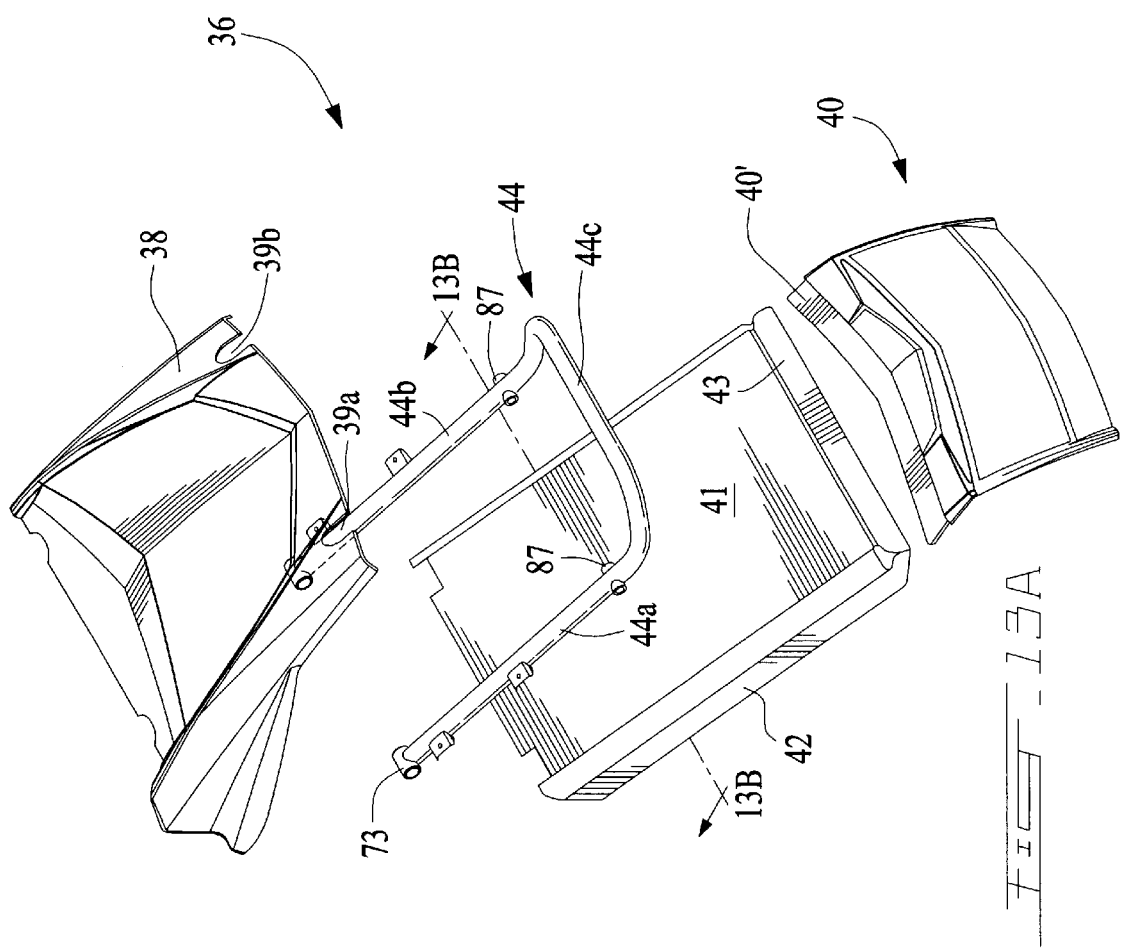
FIG_13A

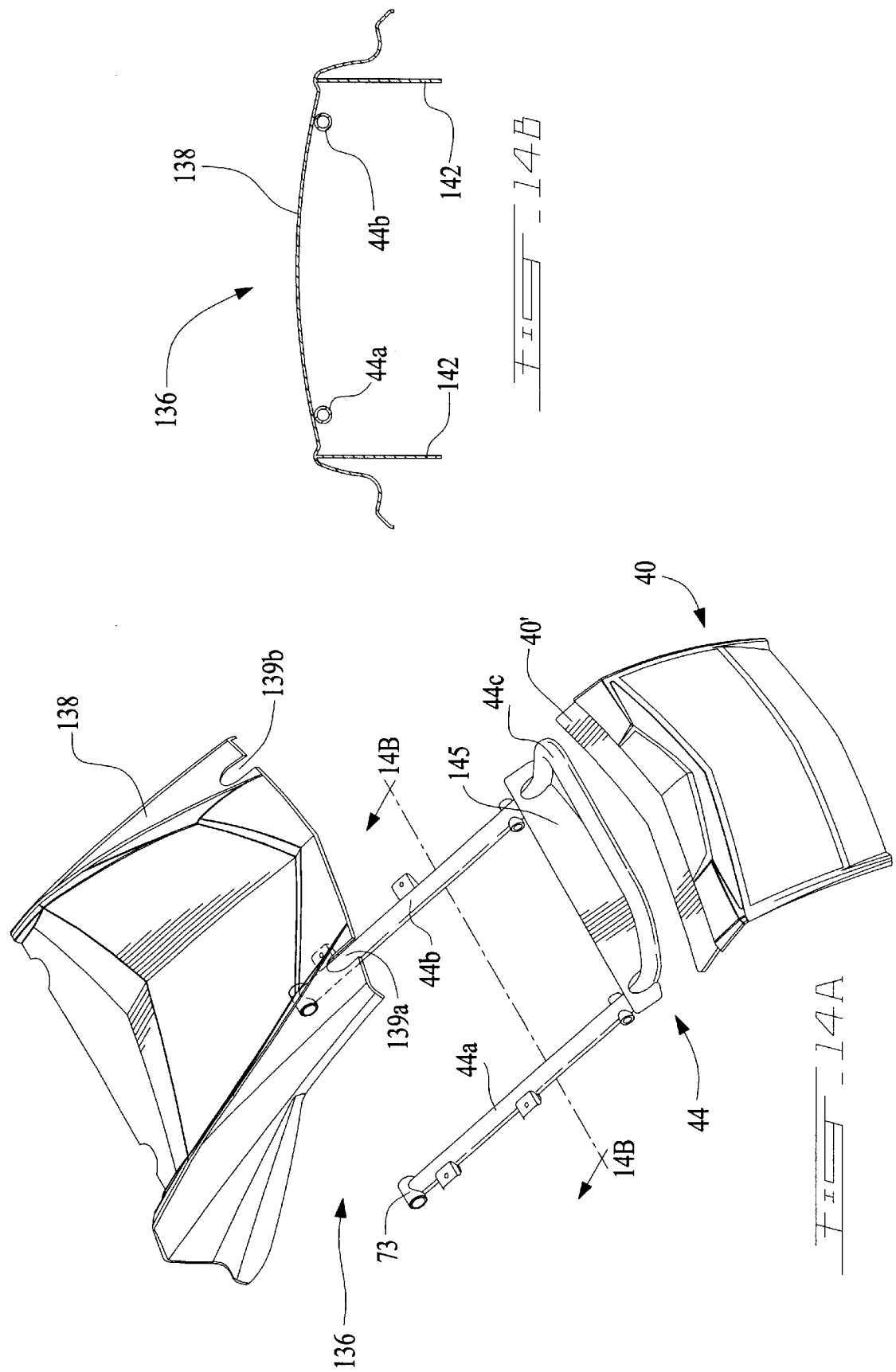

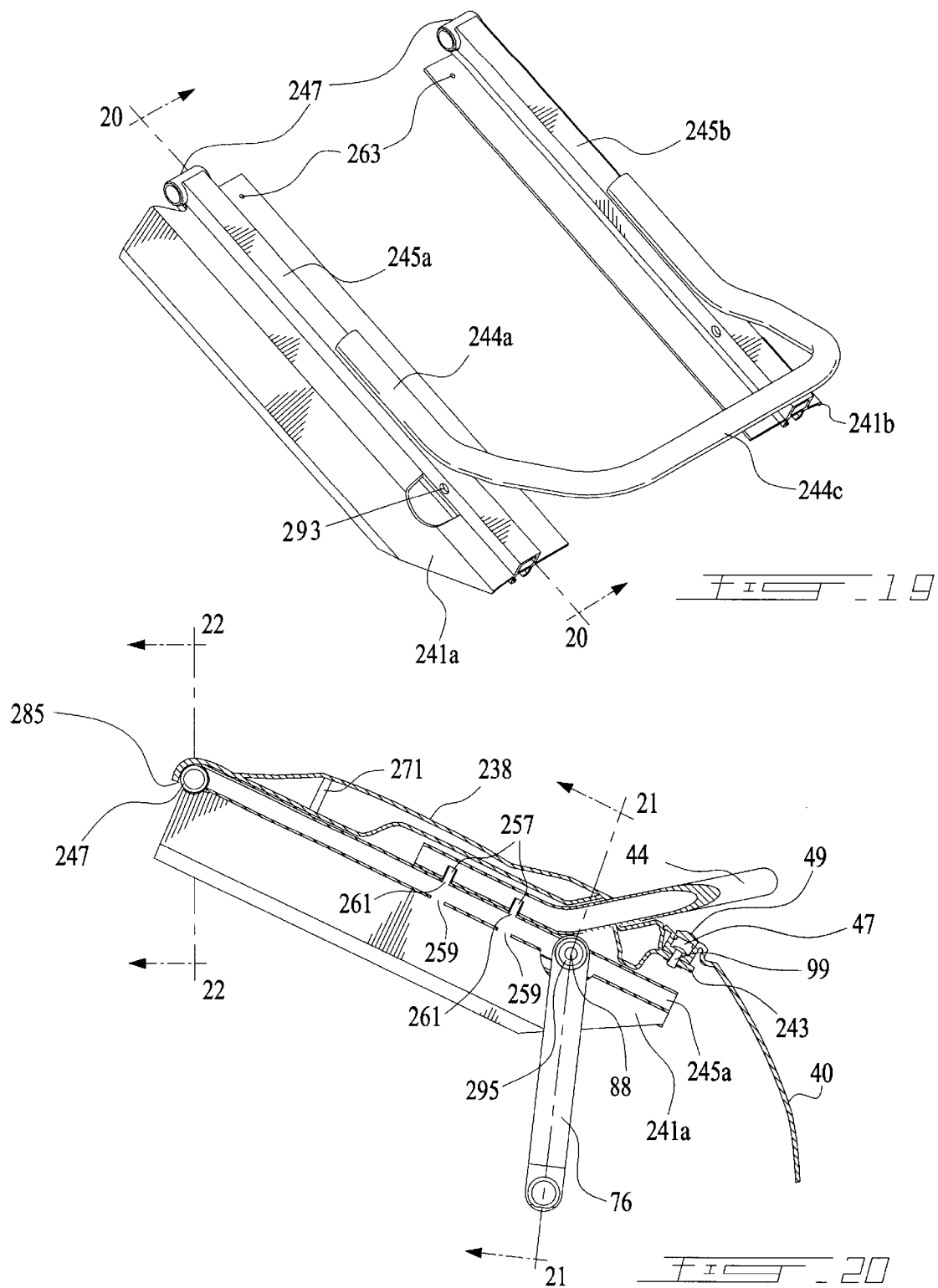

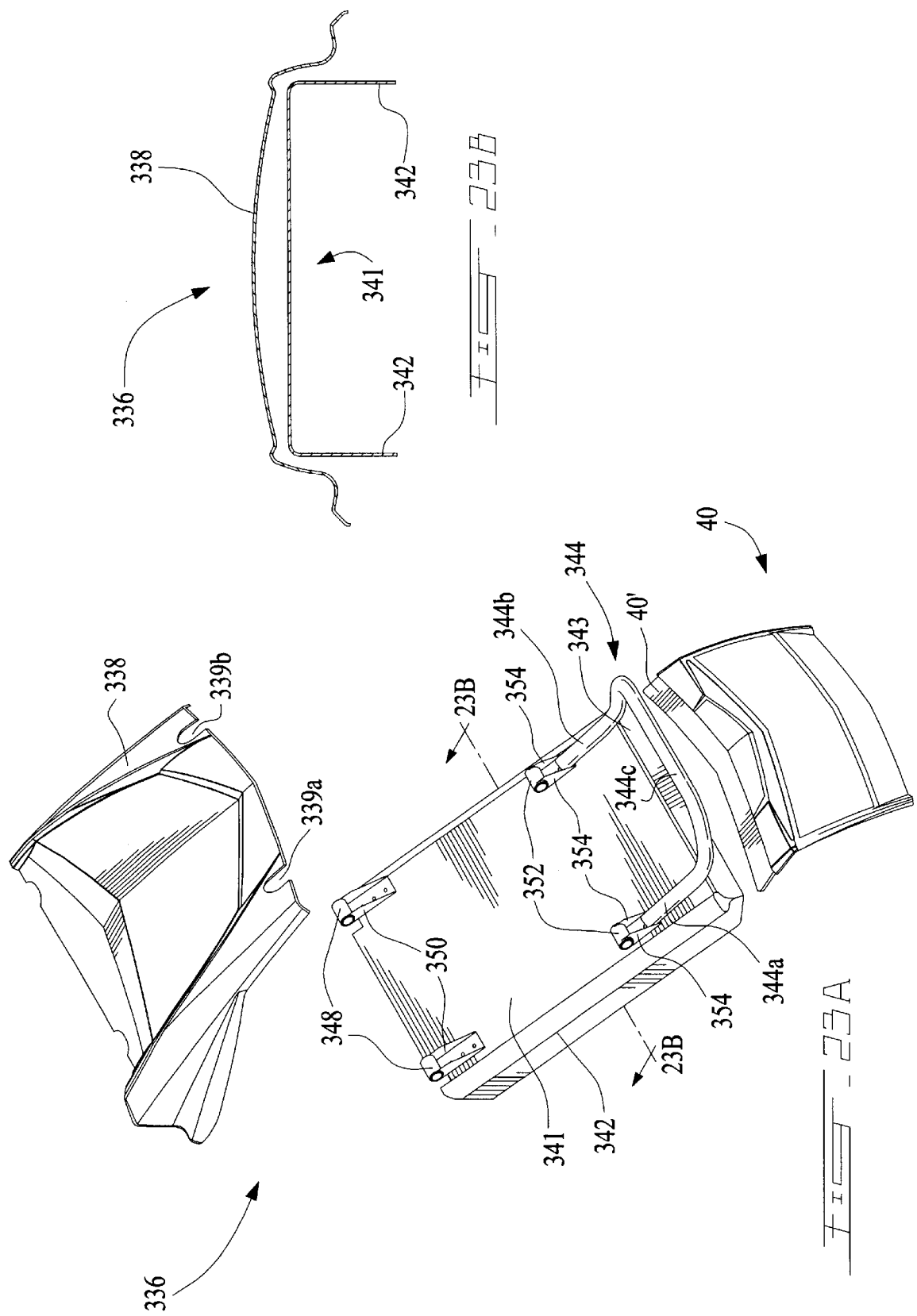

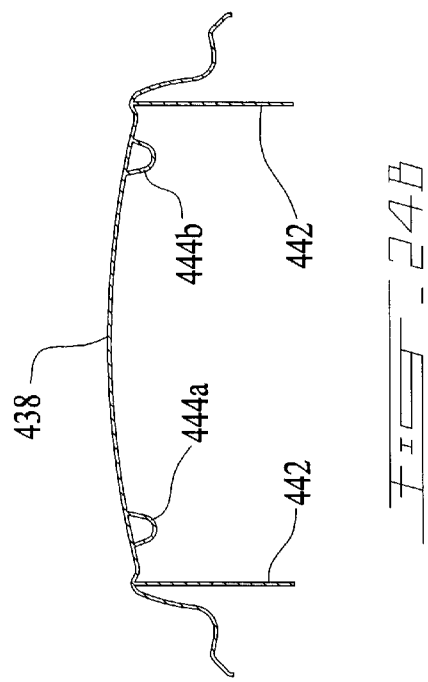
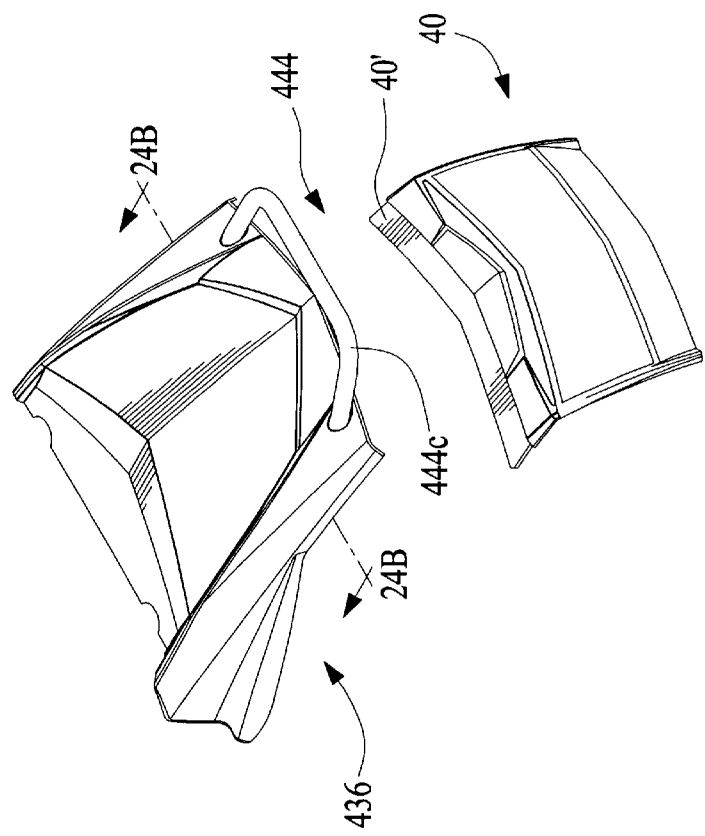

SNOWMOBILE WITH PIVOTABLE REAR SNOW FLAP

CROSS-REFERENCE TO RELATED APPLICATIONS

This application claims the benefit of priority to U.S. application Ser. No. 60/252,404, filed Nov. 22, 2000, the contents of which are herein incorporated by reference. This application is a continuation-in-part of U.S. application Ser. No. 09/472,134, filed Dec. 23, 1999, the contents of which are incorporated herein by reference. This Application and U.S. application Ser. No. 09/472,134 claim priority to U.S. application Ser. No. 60/167,614 filed Nov. 26, 1999, which is also incorporated herein by reference. This application and U.S. application Ser. No. 09/472,134 also claim priority to Canadian Patent Application No. 2,256,944, filed on Dec. 23, 1998, which also is incorporated herein by reference. This application is also a continuation-in-part of U.S. application Ser. No. 09/472,133, filed Dec. 23, 1999 now abandoned, the entire content of which is incorporated herein by reference.

BACKGROUND OF THE INVENTION

1. Field of the Invention

The invention relates in general to snowmobiles and, more particularly, to a snowmobile with a movable rear snow flap.

2. Background of the Invention

In general, a snowmobile has a central frame or chassis on or around which the various components of the snowmobile are assembled. Typically, a pair of skis are mounted at the front portion of the chassis and an internal combustion engine drives a ground-engaging track that is centrally mounted under the chassis.

In conventional snowmobiles, the track is provided under the chassis in such a manner that the entire length of the track is located beneath the "tunnel" formed by the chassis, as illustrated in FIG. 1. A snow guard typically is provided at the rear of the chassis to prevent snow that the track engages from spraying excessively in an upward or rearward direction.

In contrast, in the snowmobile disclosed in U.S. patent application Ser. No. 60/167,614, the length of the chassis is reduced and a rear portion of the track extends beyond the rear end of the chassis. As discussed in that provisional patent application, such a configuration improves the maneuverability and overall performance of the sled. In particular, shortening the chassis reduces the overall weight of the snowmobile and, hence, reduces the polar moment of inertia, thereby allowing the snowmobile to turn more quickly. Shortening the chassis, however, exposes part of the rear portion of the track and leaves that rear portion uncovered, which may result in greater amounts of snow being splashed or sprayed upwardly and/or rearwardly than is desired.

Furthermore, when the entirety of the track system is positioned under the chassis, as in conventional snowmobiles, the chassis limits the range of "travel" of the rear suspension system. In particular, it has been observed that as a conventional snowmobile moves over uneven terrain, as the track system moves to the upper limit of the range of travel or the rear suspension system, the rotating track may strike the undersurface of the chassis.

It is generally believed that a rear suspension system with a greater range of movement performs better than a rear suspension system with a more limited range of movement. Previously, attempts to increase the range of movement of the rear suspension system have been made either by changing the tilt angle of the chassis or by rearranging the components of the rear suspension system.

SUMMARY OF THE INVENTION

Accordingly, it is an object of the invention to overcome these limitations or drawbacks of snowmobiles according to the prior art.

In one aspect, the invention features a snowmobile in which the chassis is shorter than in conventional snowmobiles and does not extend over the entire track. Rather, the track extends longitudinally rearwardly beyond the rear end of the chassis. This reduces the weight of the snowmobile and hence, because the length of the chassis is reduced, the polar moment of inertia of the snowmobile. This reduction in weight and polar moment of inertia improves maneuverability and overall performance of the snowmobile.

Because the end of the chassis does not shield the track system from spraying snow up and/or rearwardly, a pivotal snow flap is provided above and extending beyond the rear portion of the track to prevent or substantially reduce the amount of snow sprayed by the tread as the snowmobile moves through the snow. The snow flap is pivotally connected at its forward end to the rear end of the chassis and is caused to pivot by virtue of its connection to the track system by means of linkage struts. The linkage struts are pivotally connected to a portion of the snow flap and to the track system. This arrangement causes the snow flap to pivot relative to the chassis as the track system moves through its range of travel and keeps the track shielded. Additionally, because the snow flap moves with the rear suspension travel, the tread will not contact the snow flap and/or the chassis, and hence will not abrade and degrade those components.

In another aspect, the invention features a handle-shaped bumper that is connected to the snow flap. Because the snow flap is connected to the track system, it is easier to lift the rear of the snowmobile when necessary to do so, e.g., when lifting the snowmobile out of a small gully. This is because the lifting action acts virtually directly on the track system via the bumper (which is connected to it), whereas in the prior art, it was customary to lift through a bumper mounted at the rear of the chassis and a certain degree of lifting motion was lost as the chassis rose relative to the track system (as the "play" in the suspension system was being taken up) before the tread ever began to be lifted from the ground. Additionally, lifting the rear end of the snowmobile according to the invention is easier with the bumper connected to the snow flap than the case where the bumper extends from the rear of the chassis because the lower position requires a person lifting the rear of the snowmobile to bend from the knees to reach it, whereas the prior art arrangements only required the person to bend from the waist to reach the bumper, and it is easier to lift "with the legs" than "with the back."

BRIEF DESCRIPTION OF THE DRAWINGS

These and other features of the invention will be explained with reference to the following drawings, in which like reference characters represent like features, wherein:

FIG. 13A is an assembly view of one embodiment of a pivotable snow flap according to the invention, and FIG. 13B is a section view taken along line 13B—13B;

FIG. 14A is an assembly view of another embodiment of a pivotable snow flap according to the invention, and FIG. 14B is a section view taken along line 14B—14B;

FIG. 19 is a diagrammatic, rear perspective view illustrating the connection between the bumper and the skirt members in the preferred embodiments of the flap illustrated in FIGS. 15–18;

FIG. 20 is a section view as seen along line 20—20 in FIG. 15 (as well as in FIG. 19);

FIGS. 23A, 23B, 24A and 24B are views similar to FIGS. 13A, 13B, 14A, and 14B illustrating further embodiments of the pivotable snow flap according to the invention.

DETAILED DESCRIPTION OF EXEMPLARY EMBODIMENTS

Figure 1:
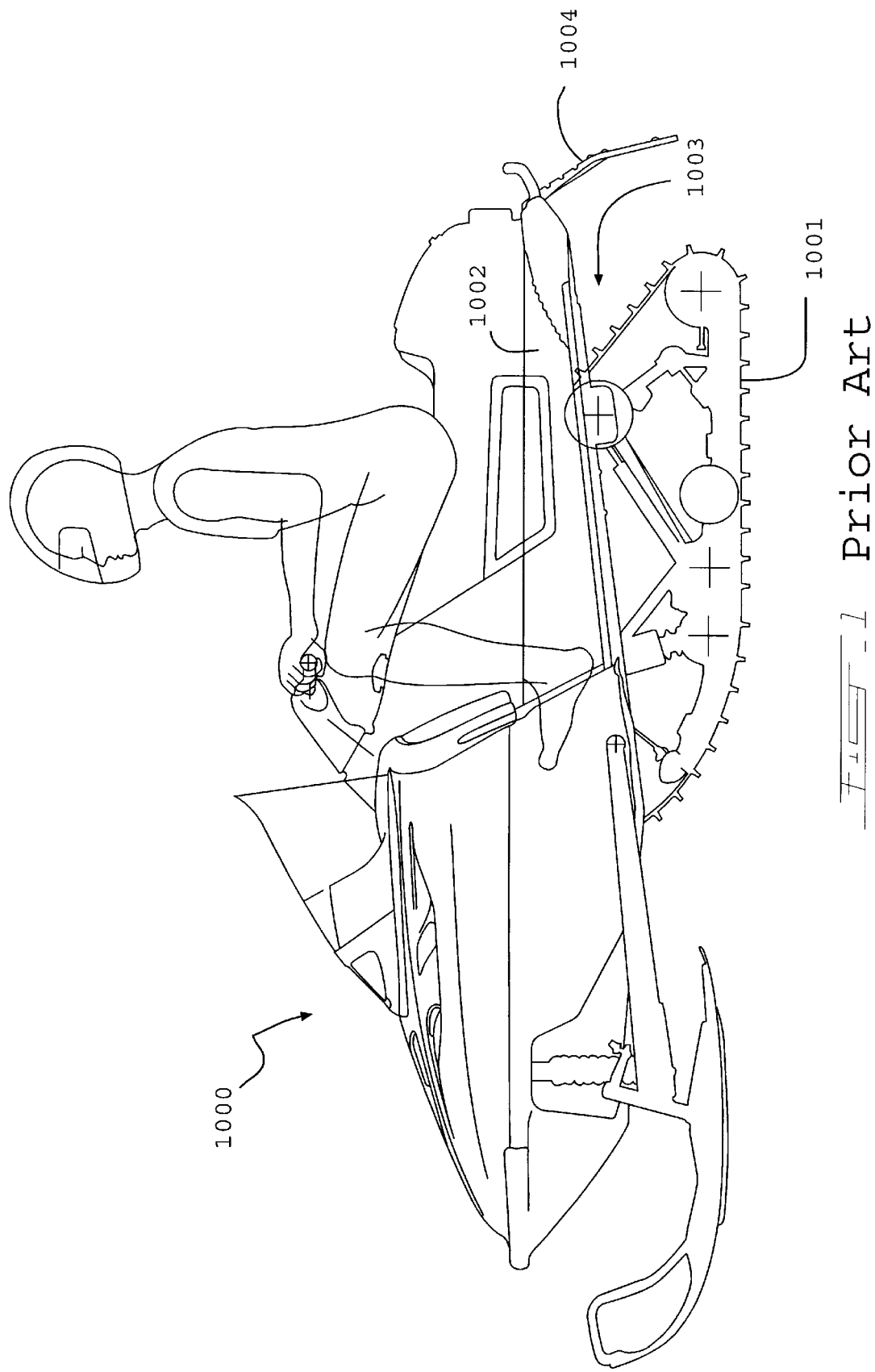
FIG. 1 is a diagrammatic, side elevation view illustrating a snowmobile according to the prior art.
Figure 2:
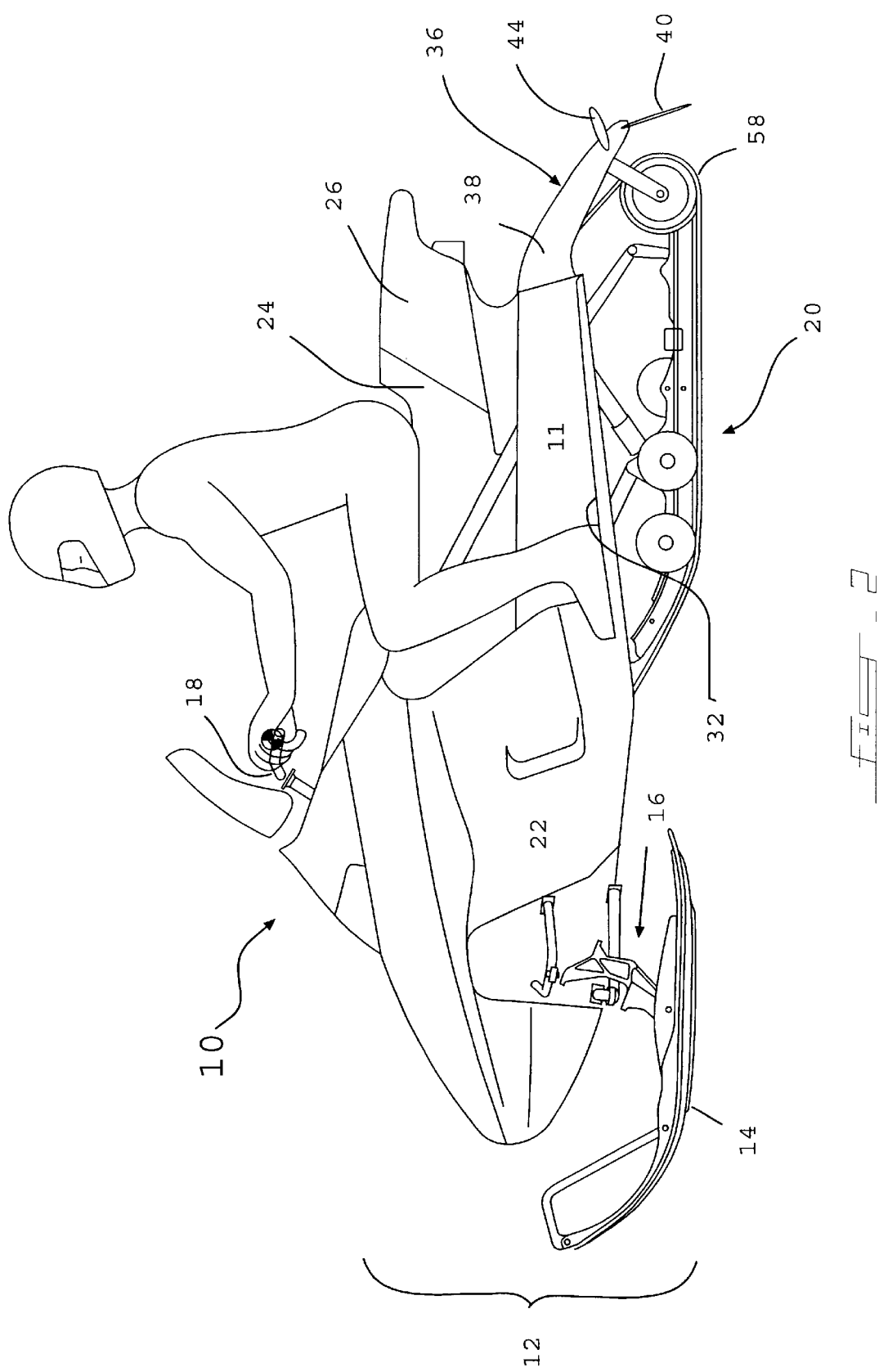
FIGS. 2–6 are diagrammatic side elevation, front perspective, side elevation, front, and plan views, respectively, of a snowmobile according to the invention.
Figure 3:
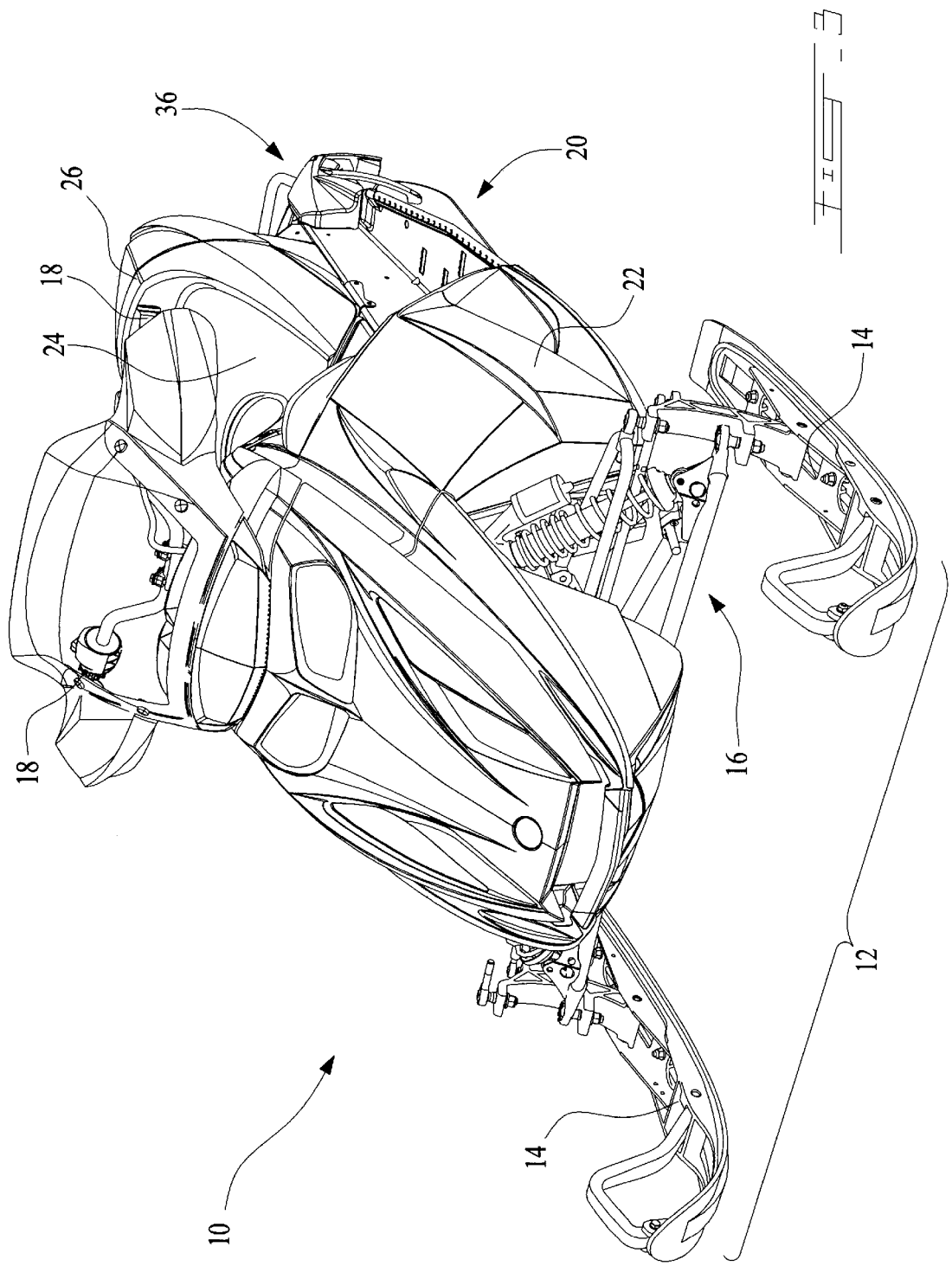
Figure 4:
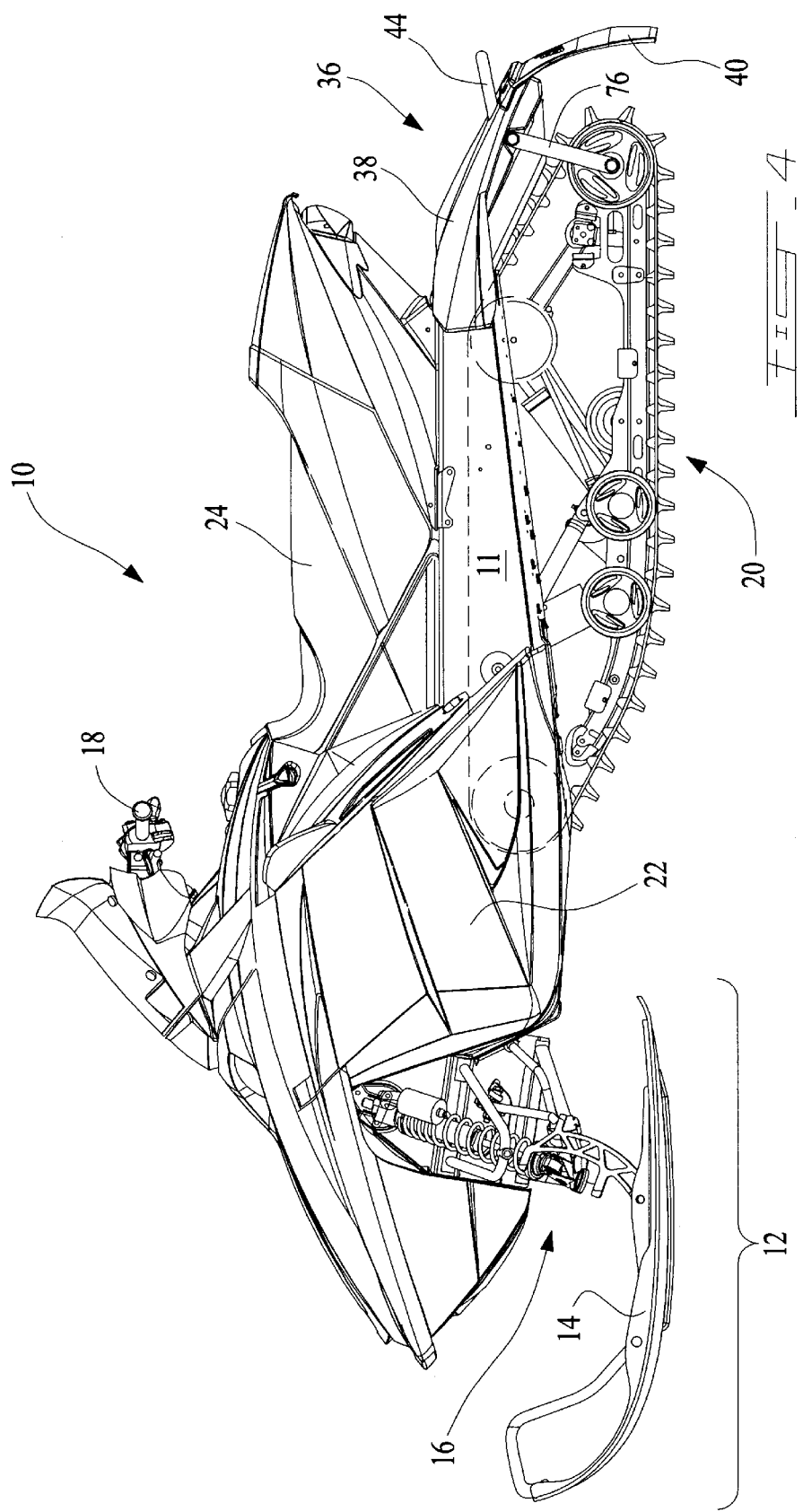
Figure 5:
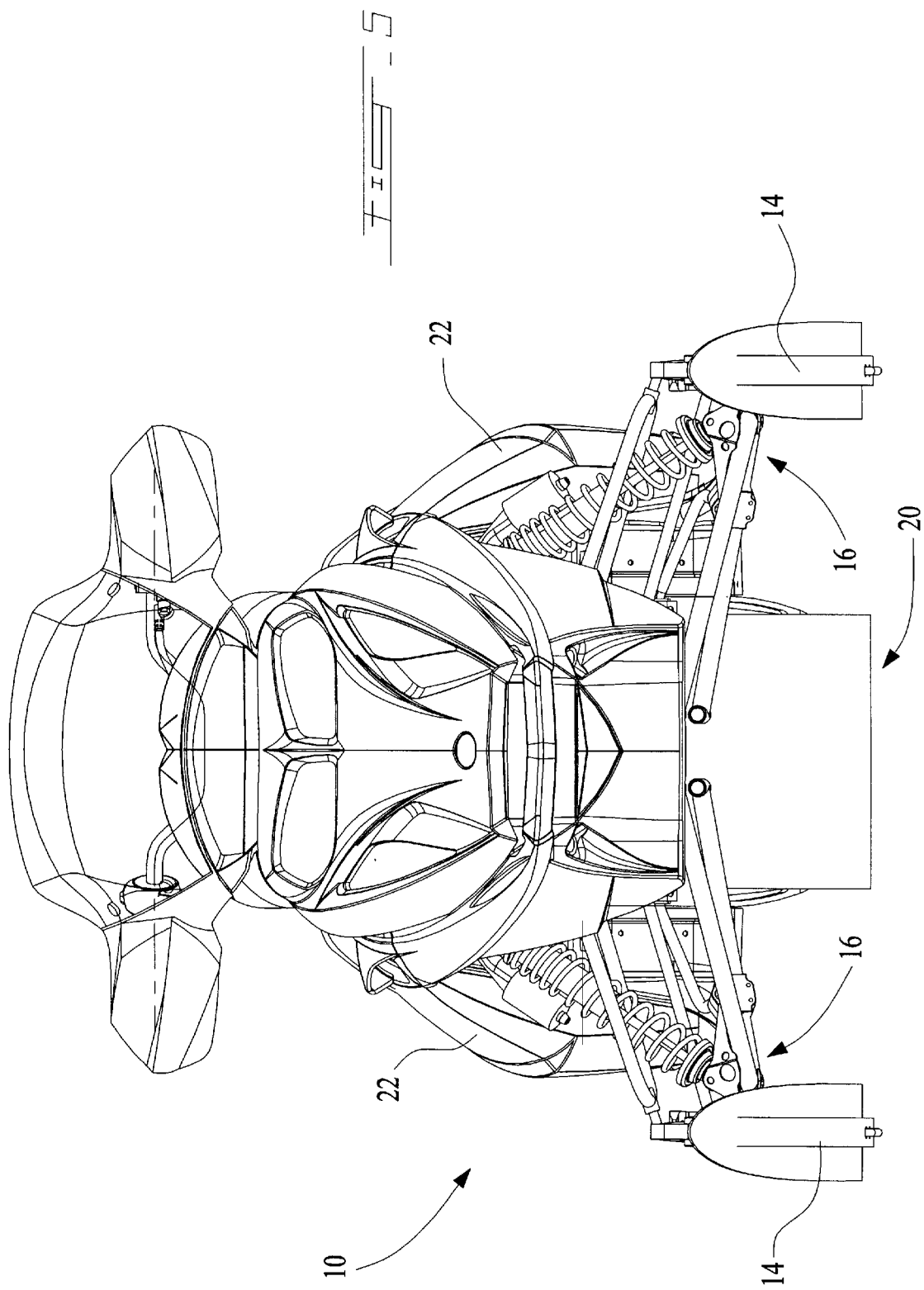
Figure 6:
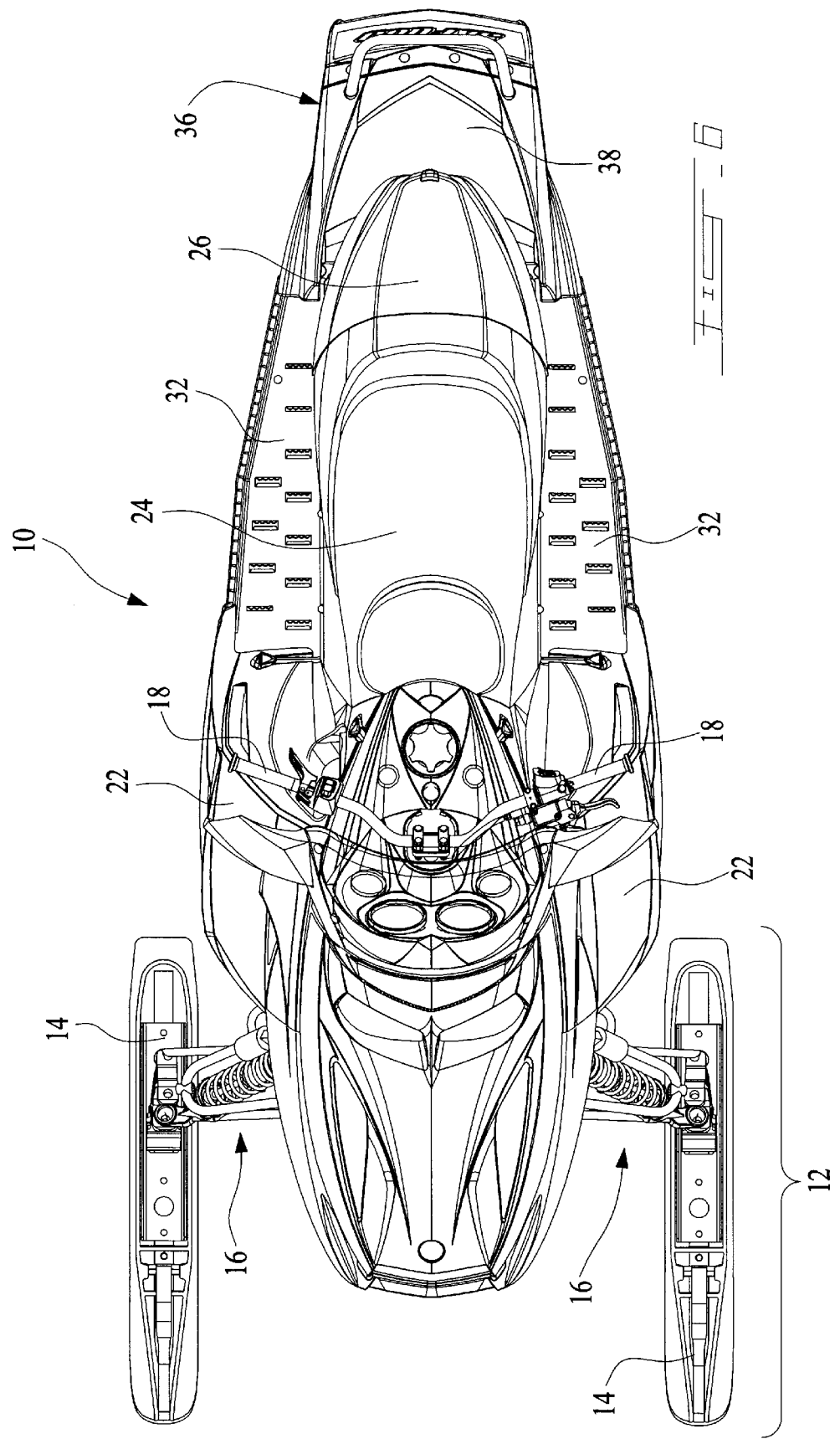
Figure 7:
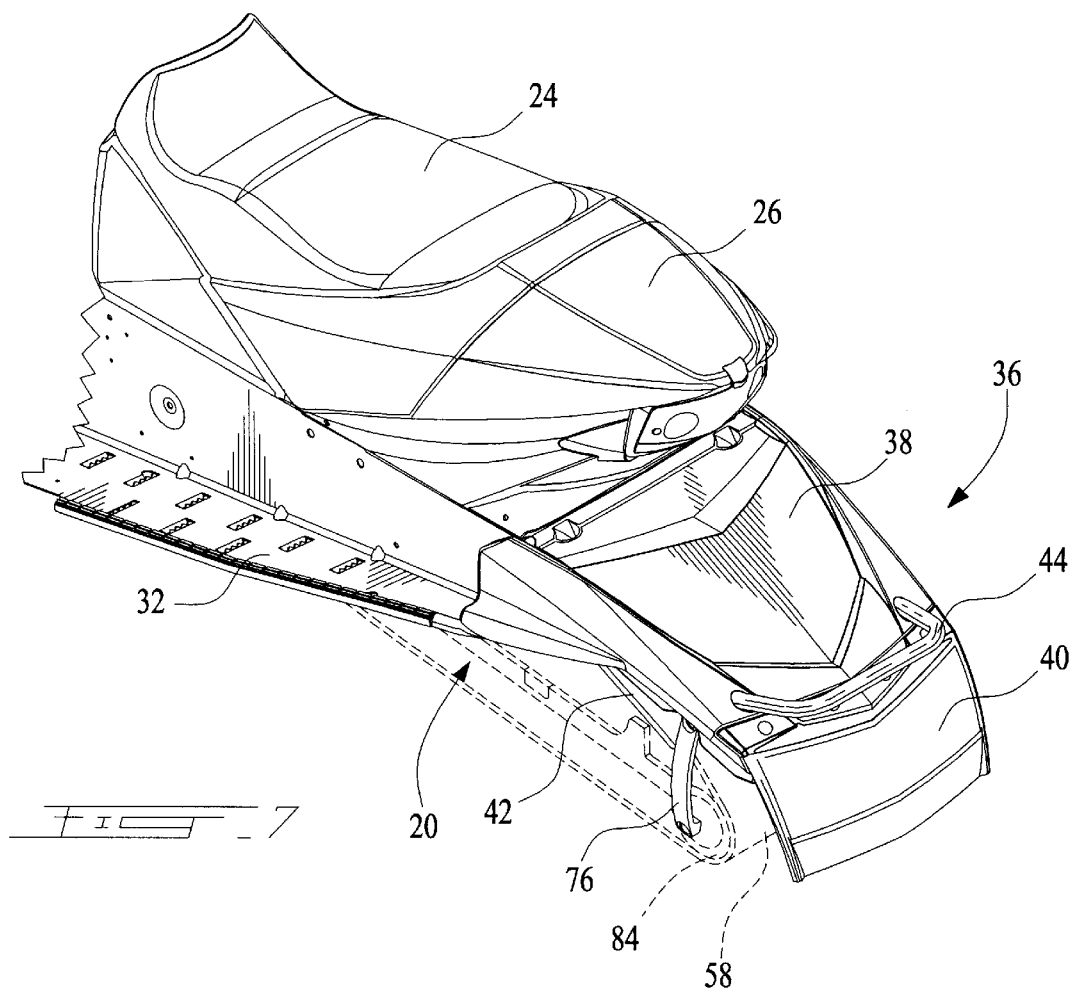
FIG. 7 is a rear perspective view of a snowmobile according to the invention.

The overall configuration of a snowmobile 10 according to the invention is shown in FIGS. 2–6. In general, the snowmobile 10 includes an aluminum chassis 11 around which the various snowmobile components are assembled. The snowmobile has a front suspension system 12 located at a forward portion of the chassis to support the forward portion of the snowmobile 10 on the ground. The front suspension 12 includes a pair of skis 14 which are positioned at the laterally outermost end portions of suspension arms 16, which suspension arms have, e.g., shock absorbing struts to absorb vibrations as the snowmobile 10 passes over uneven terrain. The skis 14 and the suspension arms 16 are constructed so that the skis 14 can be pivoted laterally to steer the snowmobile 10, e.g., by turning handlebars 18. Although a front suspension system 12 having two skis 14 is shown, it is contemplated that a snowmobile having a single, relatively wide central ski might also be constructed in accordance with the invention, as might be an all-terrain vehicle which has a wheel or wheels instead of the skis and/or the track system.

A propulsion-providing track system 20 is laterally centrally mounted under the chassis and extends rearward past the rear end of the chassis 11. The track system 20 has a belt-type tread or track 58 which rotates around the periphery of the track system 20 to propel the snowmobile 10 through the snow. An internal combustion engine (not shown), located at the forward portion of the chassis 11 and enclosed within fairings 22, drives the tread 58 via a constant variable transmission system, as is known in the art.

A cushioned seat 24 is provided on the upper, mid- to rear-portion of the chassis 11, and a fiberglass tail fairing 26 is provided behind the seat 24. The snowmobile operator sits on the seat 24, with his or her feet positioned on footrests 32 on the chassis 11 (see FIGS. 2 and 6).

The snowmobile 10 further has a movable snow flap 36 that is pivotally connected to and extends from the rearmost portion of the chassis 11. The snow flap 36 is positioned above the track system 20 and extends longitudinally rearwardly beyond the end of the track system 20 so as to overlie the track 20. This configuration prevents or decreases the amount of snow that is sprayed up from the tread 58 when the snowmobile 10 travels through the snow and provides a safety covering over the portion of the track 20 extending beyond the end of the chassis 11.

Figure 8:
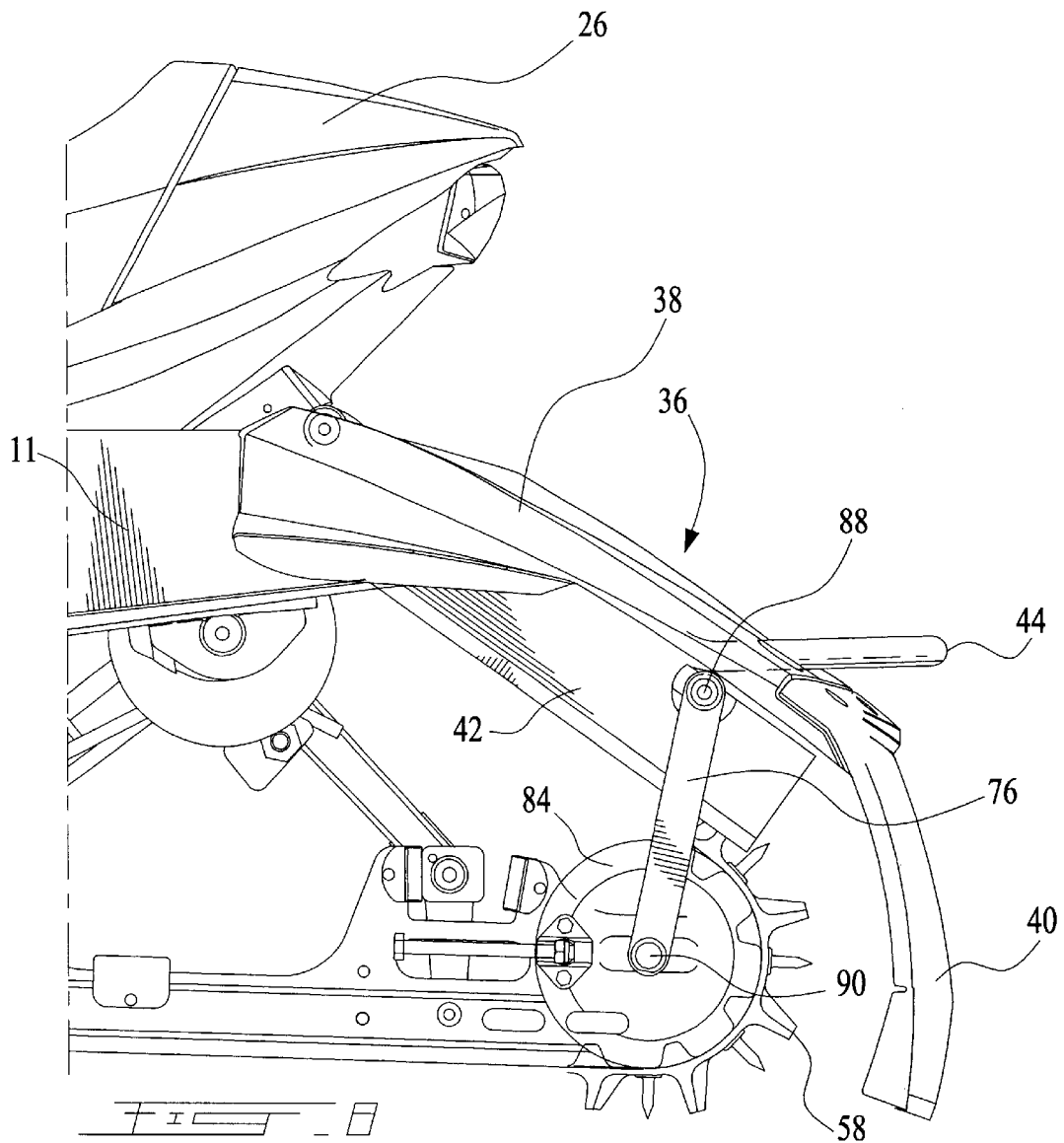
FIG. 8 is a close-up side view of the snowmobile shown in FIG. 4, highlighting features of the pivotable snow flap and track system.
Figure 16:
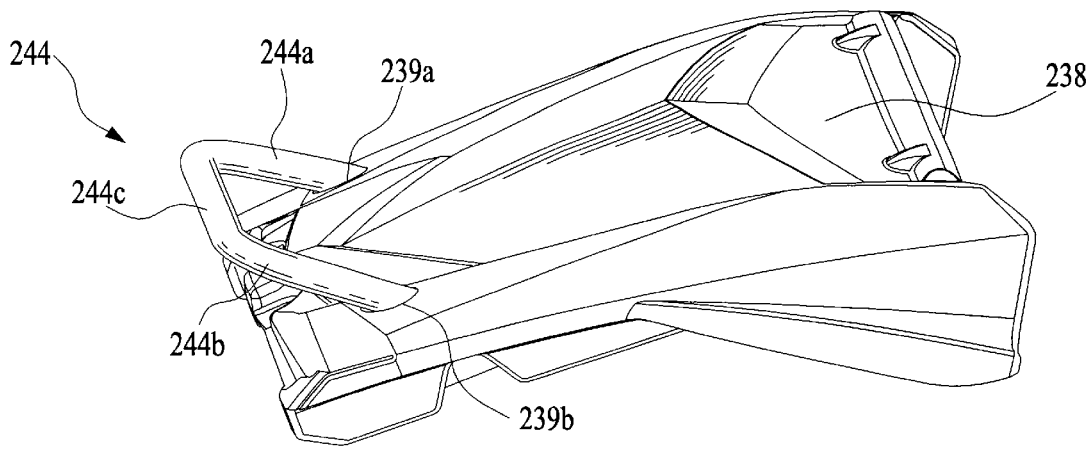

The snow flap 36 includes an upper snow guard 38 and a snow deflector 40. The snow deflector 40 is attached to and extends down from the rear end of the snow guard 38 far enough to substantially shield the rearmost portion of the track system 20 and to prevent or substantially decrease the amount of snow that is sprayed rearwardly from the tread 58. The snow flap 36 further has skirt flanges 42 (see, e.g., FIG. 8) extending down below the sides of the snow guard 38 and extending substantially along the length of the snow guard 38, with one skirt flange 42 on either side of the snow guard 38. The snow flap 36 is positioned in relatively close, generally conformal relation to the rear, upper portion of the track 20 so that rather than being thrown behind the tread 58 and falling to the ground (or out from under the sides of the flap 42 when the snowmobile 10 is turning), snow which is "kicked up" by the tread 58 falls back onto and remains on the tread 58. Thus, snow is carried by the rotating tread 58 along the top portion of the track 20. (See FIGS. 12 and 16, described below.) This, in turn, helps cool the snow-cooled radiator 98 extending along the underside of the chassis 11, thereby enhancing engine cooling.

A handle-shaped bumper 44 extends rearwardly and slightly upwardly from the rear of the snow flap 36, approximately where the snow deflector 40 joins the snow guard 38. Details of the construction and assembly of the various components of the snow flap 36 are described in greater detail below.

As illustrated in greater detail in FIGS. 7–10, the track system 20 is mounted beneath a rear portion of the chassis 11 by means of a suspension system consisting of a number of struts 50a–d. Various ones of the struts 50a–d are longitudinally compressible, consisting of, for example, spring-loaded and/or hydraulic shock absorbing members. In particular, the suspension system includes a single, spring-loaded front shock 50a (which is optional); a single, spring-loaded rear shock 50b; front suspension arm 50c, which is rigid; and rear suspension arm 50d, which is also rigid. The front shock 50a is pivotally attached at attachment points 52 and 54 on the front arm 50c and on the slide rail 56 of the track system 20, respectively; the rear shock 50b is pivotally attached at attachment points 60 and 62 on the rear arm 50d and on the slide rail 56, respectively; the front suspension arm 50c is pivotally attached at attachment points 64 and 66 within the chassis and on the slide rail 56, respectively; and the rear suspension arm 50d is pivotally attached at attachment points 68 and 70 on the chassis 11 and on the slide rail 56, respectively.

Figure 9:
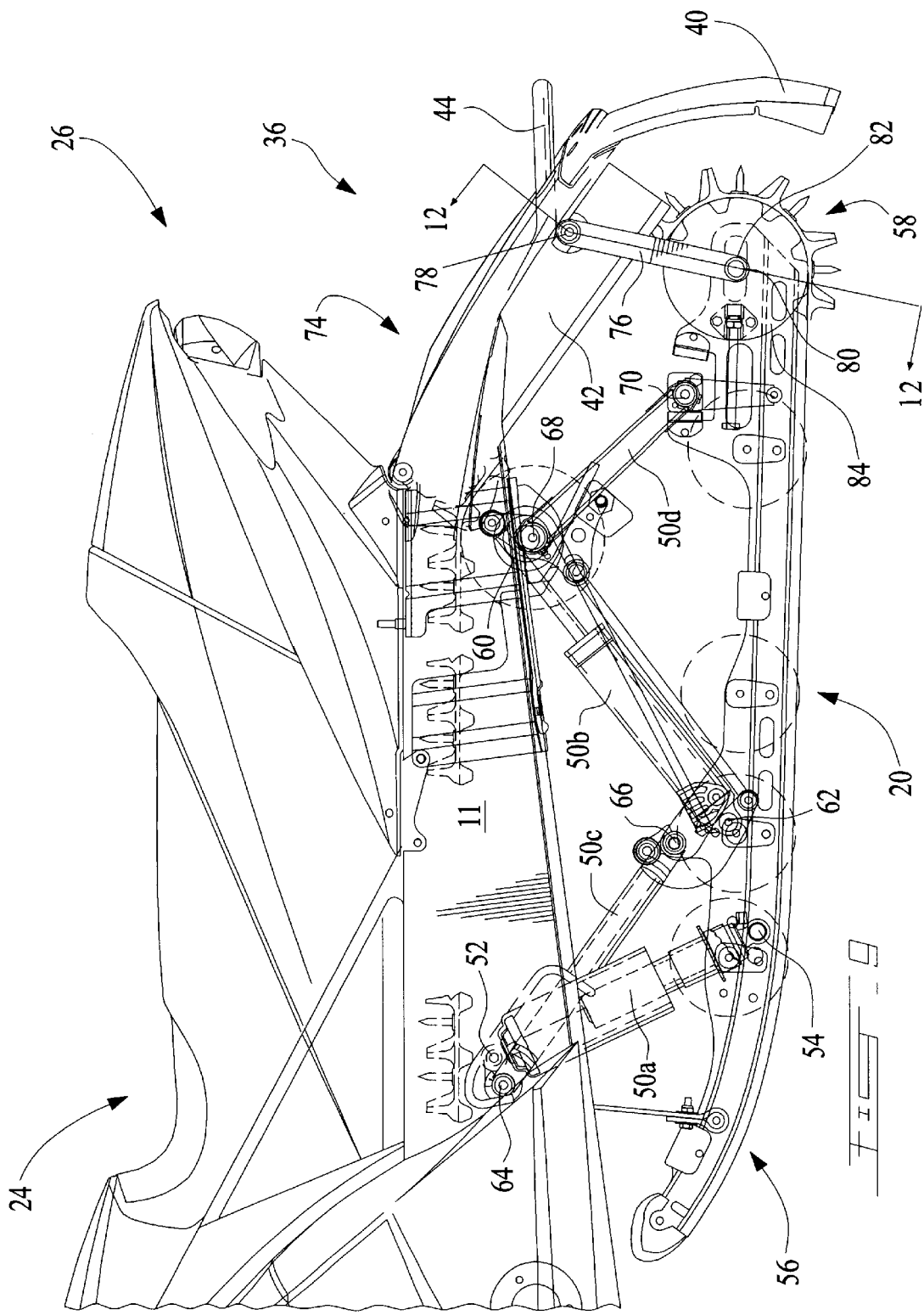
FIGS. 9 and 10 are diagrammatic side views similar to FIG. 8, illustrating the rear portion of the chassis and the range of travel of the track system and associated pivoting of the snow flap.
Figure 10:
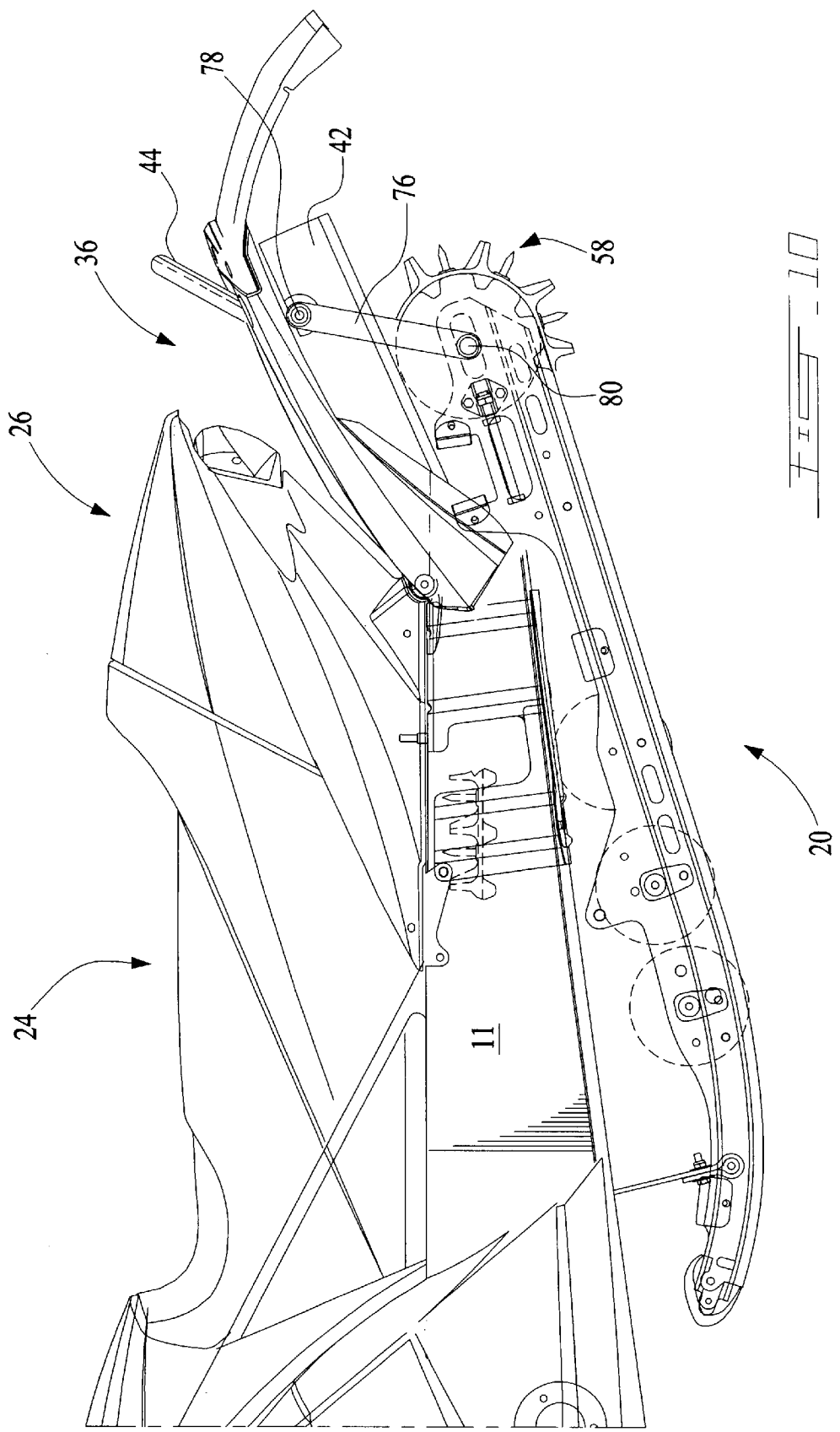

The track system 20 is designed to move through a range of motion relative to the chassis 11, as illustrated in FIGS. 9 and 10. The track system 20 will move with respect to the chassis 11 through a variety of types of motion, viz., both vertically and pivotally. The precise manner in which the track system 20 moves through its range of travel with respect to the chassis 11 will depend on the particular configuration and arrangement of the suspension system components and preferably will be tailored to the anticipated riding conditions under which the snowmobile 10 will be used. Thus, the track suspension system, and the resultant range of travel of the track system 20, allows the snowmobile 10 to be operated over varying terrain and to absorb impacts, e.g., when traveling over such varying terrain.

As further illustrated in FIGS. 9 and 10, and as described in greater detail below, the snow flap 36 is connected to the rear end 74 of the chassis so as to pivot vertically (i.e., about a horizontally extending axis) relative to the chassis 11. The upper ends of a pair of linkage struts 76 (one on either side of the snowmobile 10) are pivotally connected to the snow flap 36 at attachment points 78, and the lower ends of linkage struts 76 are pivotally connected to the track system at attachment points 80. Preferably, the attachment points 80 are formed at the outer ends of axle 82 around which rear tread guide/support wheels 84 rotate as the track 58 rotates around the periphery of the track system 20. Thus, the snow flap 36 is connected to, so as to move with, the rear portion of the track system 20, and the snow flap 36 will pivot relative to the chassis 11 as the track system 20 moves through its range of travel.

In this configuration, the flap 36 covers the portion of the track 20 extending beyond the end of the chassis 11, the flap 36 moves with and "mirrors" movements of the track system 20, and the track 58 does not contact (and hence abrade) the snow flap 36 when the track system 20 reaches the limit of its range of travel (e.g., when riding across "mogols"). At the same time, because the snow flap 36 moves with the track system 20, it remains in a shielding position above and extending behind the track system 20 and thus prevents or substantially reduces the amount of snow that is sprayed up and/or rearwardly by the track 58. Furthermore, the shorter chassis 11 (relative to conventional, prior art snowmobiles) has a smaller polar moment of inertia. Hence, a snowmobile according to the invention has improved turning performance.

Figure 11:
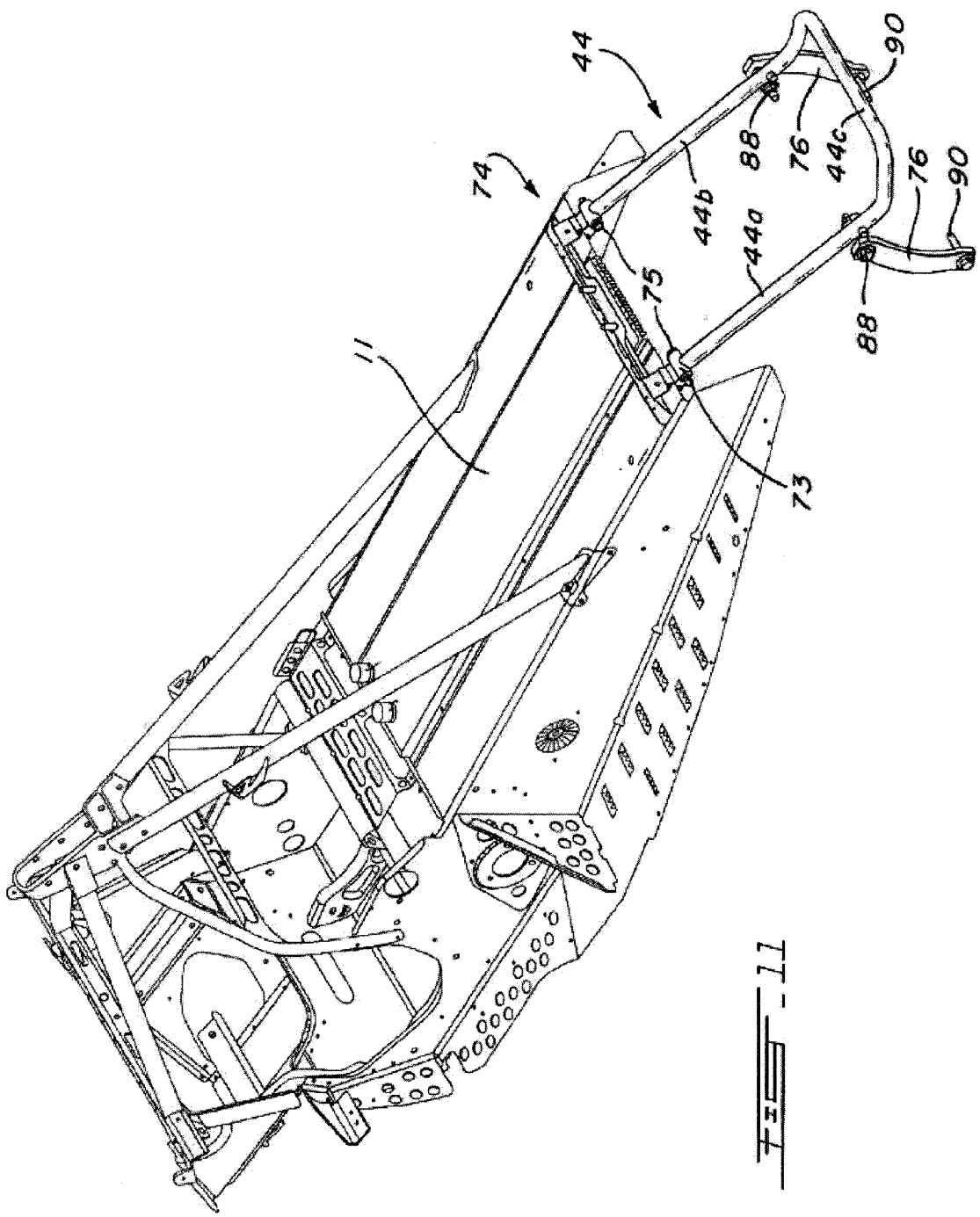
FIG. 11 is a rear perspective view illustrating the chassis and one embodiment of a bumper member (part of the pivotable snow flap) according to the invention.
Figure 12:
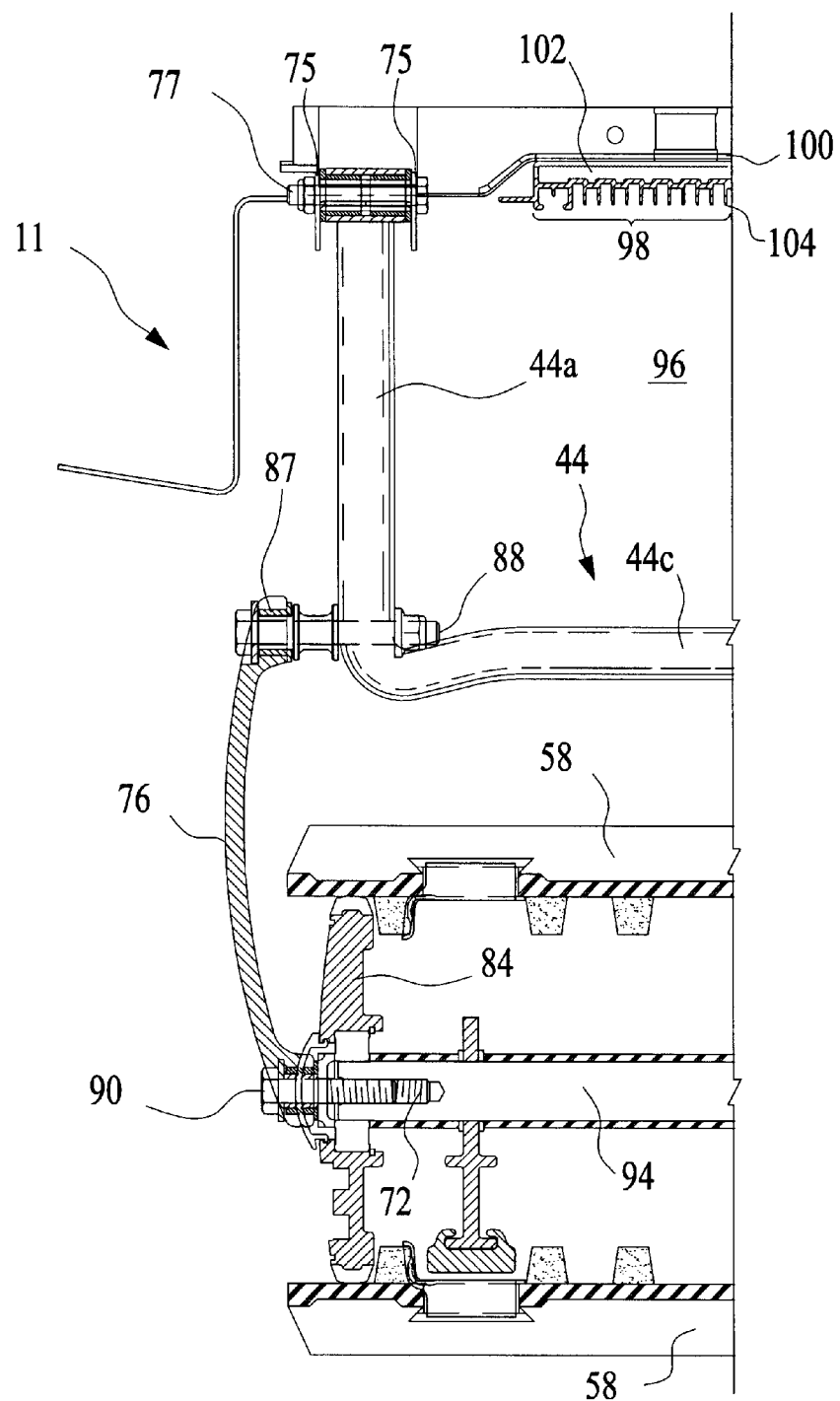
FIG. 12 is a rear view of the chassis assembly shown in FIG. 9, partially in section, taken along line 12—12.

As illustrated in FIGS. 11–24B, the snow flap 36 may be constructed in a number of different configurations. A first embodiment is illustrated in FIGS. 11–13B. In this embodiment, the bumper 44 is generally U-shaped and formed from extruded aluminum tubing and is itself pivotally attached to the rear portion 74 of the chassis 11. A journal sleeve 73 at the forward end of each arm 44a, 44b is pivotally connected between lugs 75 extending from the rear end 74 of the chassis 11, e.g., by pins 77. Linkage struts 76 are pivotally connected to the arms 44a and 44b, e.g., by pins 88 passing through apertures in the arms 44a and 44b, as shown in FIG. 12, with aluminum sleeves 87 surrounding them. Bolts 72 pass through apertures in the lower ends of the linkage struts 76 and are threaded into bores 92 extending inward from the ends of axle 94 on which rear tread guide support wheels 84 rotate to secure the linkage struts 76 (and hence connect the flap member 36) to the track system 20.

As further illustrated in FIG. 12, certain components of the snowmobile 10 preferably are located within the inverted U-shaped tunnel region 96 formed by the chassis 11. For example, FIG. 12 illustrates the radiator 98. The radiator 98 extends longitudinally along the length of the underside of the upper panel 100 of the chassis 11. The radiator 98 has longitudinally extending internal passages 102 through which coolant (such as ethylene glycol) passes and cooling vanes 104. As snow sprays up from the track 58 and is carried into the tunnel region 96 of the chassis 11 as described above, it absorbs heat from the radiator 98 and helps to cool the engine.

As illustrated in FIGS. 13A and 13B, the bumper 44 is "sandwiched" between the snow guard 38 and a skirt member 41, which preferably is formed as a generally U-shaped extruded channel, from sheet metal such as aluminum, or other suitable material such as molded plastic, reinforced plastic, or other structurally comparable material. The snow guard 38 and skirt member 41 are secured together, sandwiching the bumper 44, e.g., by rivets passing through the arms 44a and 44b or by other suitable means. Cut-outs 39a and 39b in the snow guard 38 fit over the arms 44a and 44b, respectively, and facilitate a secure fit between the components. The leading edge flange portion 40' of the snow deflector 40 fits over the trailing edge 43 of the skirt member 41, beneath the rear, handle portion 44c of the bumper 44, and is secured to the trailing edge 43 of the skirt member 41 by means, e.g., of rivets or other suitable fasteners.

In an alternative embodiment illustrated in FIGS. 14A and 14B, the skirt and the snow guard are integrally formed as a single, contiguous unit 136 preferably from injection-molded thermoplastic resin. The unit 136 has skirt flanges 142 that are integral with the snow guard 138. The unit 136 fits down over the arms 44a and 44b of the bumper 44, with the arms 44a and 44b of the bumper 44 fitting within cut-outs 139a and 139b in the rear edge of the snow guard portion 138 of the unit 136 in a similar fashion to the embodiment shown in FIGS. 13A and 13B. A cross-member 145, which may be formed from any rigid material such as aluminum or a thermoplastic material, extends between the arms 44a and 44b of at the rear of the bumper 44, where the arms 44a and 44b join the base portion of the U. The cross-member 145 provides an attachment point for the leading edge flange portion 40' of the snow deflector 40, which is secured to the cross-member 145 using rivets or other suitable fasteners.

A more preferred embodiment of the snow flap 236 is illustrated in FIGS. 15–22. In this embodiment of the snow flap 236, the snow guard 238 is formed as a generally hollow, blow-molded member. Preferably, it is made from high density polyethylene (HDPE) or other smooth, low-friction material so as to prevent snow from accumulating on the undersurface of the snow guard 238 (thereby permitting the snow to slide forward along the underside of the snow guard 238 so that it may be carried forward to help cool the radiator 98, as described above).

The snow guard 238 has apertures 239a and 239b passing through it at a trailing portion thereof, from an upper surface to a lower surface. The apertures conform generally to the profile of an oblique section (i.e., a section taken at an angle relative to the longitudinal axis) of each of the bumper arms 244a and 244b. During assembly, the forward ends of the bumper arms 244a and 244b are passed through the apertures 239a and 239b, respectively, and the bumper 244 is rotated (handle portion 244c downwardly) such that the arms 244a and 244b fit snugly within channels 246a and 246b that are formed into the undersurface of the snow guard 238.

Figure 21:
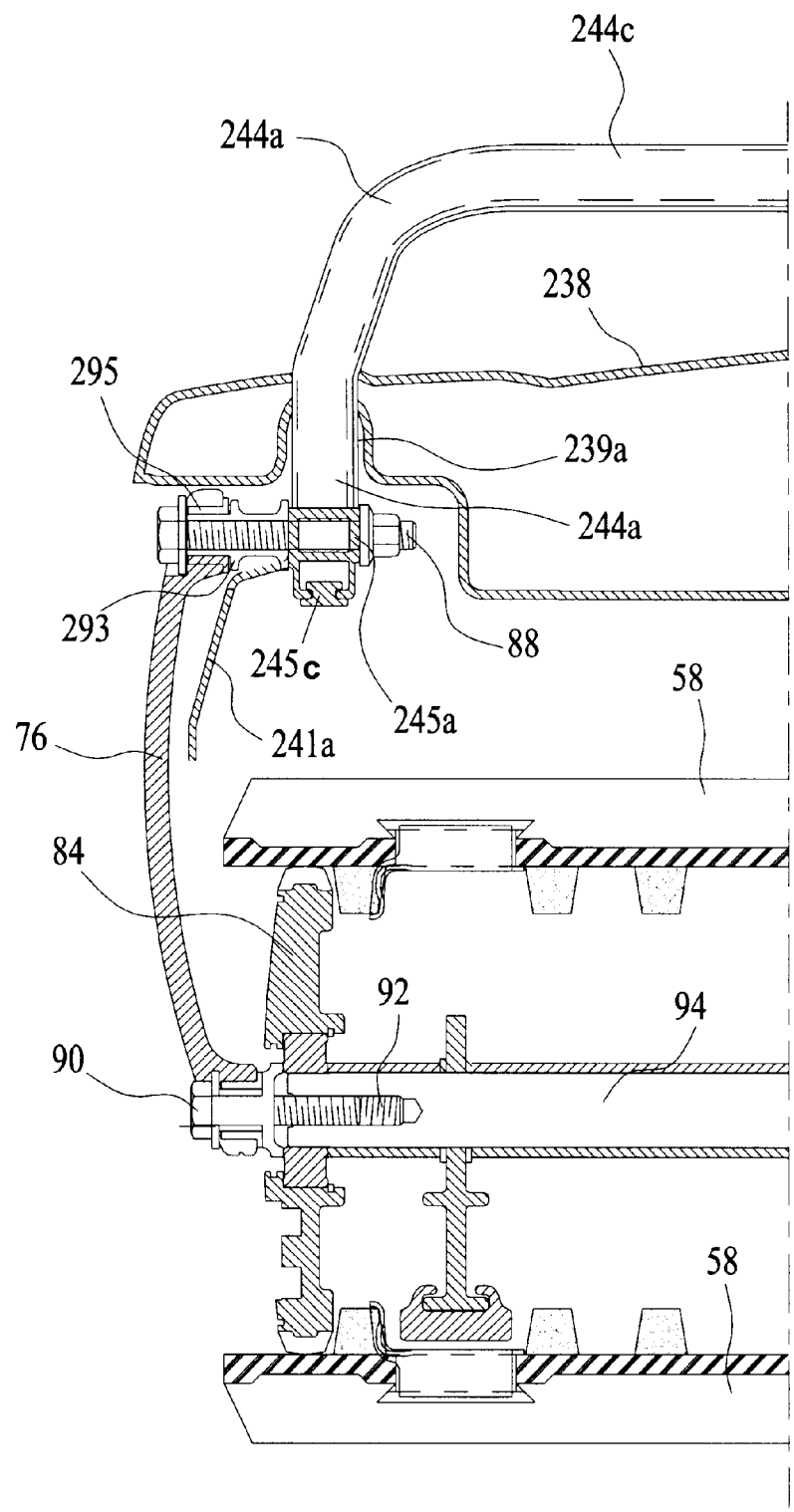
FIG. 21 is a half-section view taken along line 21—21 in FIG. 20.

As illustrated in FIG. 19 (with the snow guard 238 not shown), left and right skirt members 241a and 241b are securely fastened to the undersides of the bumper arms 244a and 244b, respectively. The skirt members 241a and 241b are formed from extruded aluminum, with hollow, channel-shaped reinforcing/connection ribs 245a and 245b extending longitudinally along the length of each of the skirt members 241a and 241b, respectively. As shown in FIG. 21, each reinforcing/connection rib 245a and 245b includes a protector member 245c that protects the snow guard 238 from abrasion by the track 58.

Figure 17:
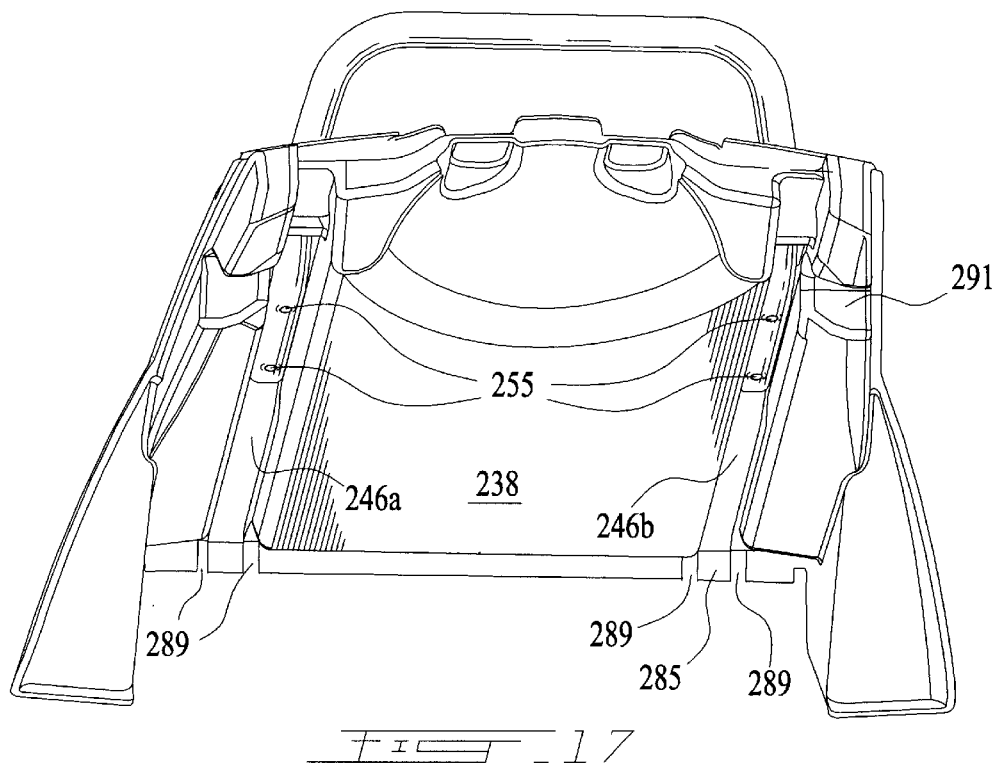
Figure 18:
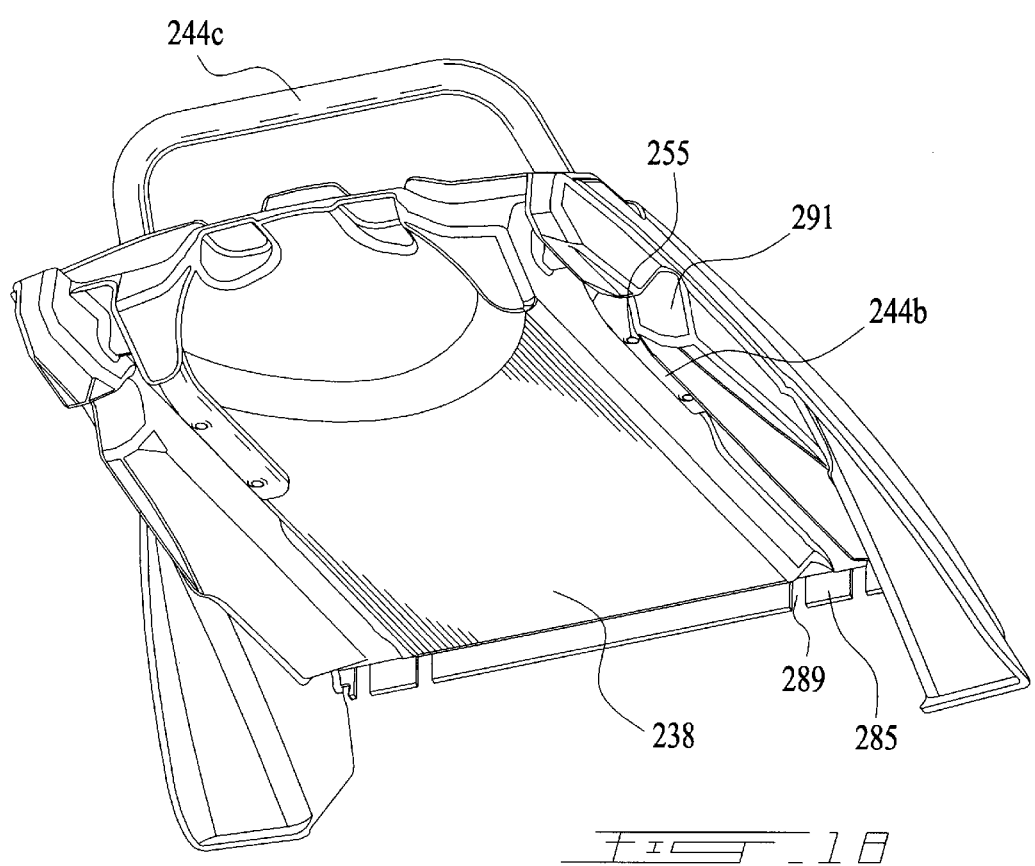

As shown in FIGS. 17 and 18, a pair of apertures 255 are formed through the bottom wall of each of the bumper arms 244a and 244b, where the arms of the bumper 244 (which is formed from a hollow, tubular aluminum extrusion) are slightly flattened. AK series threaded inserts 257 available from AVK Industrial Products in Valencia, Calif., are installed within the interior portions of the bumper arms through apertures 255, as illustrated in FIG. 20. The skirt members 241a and 241b are then secured to the undersurfaces of the bumper arms 244a and 244b, respectively, by means of bolts (not shown) which are passed through apertures 259 and 261 formed, respectively, in the lower and upper walls of the ribs 245a and 245b and which are screwed into the inserts 257. Thus, the snow guard 238 is secured between the bumper member 244 and the skirt members 241a and 241b at its rear portion by virtue of the bumper arms 244a and 244b passing through the apertures 239a and 239b. Additionally, it is preferable to secure the snow guard 238 to the forward portion of each of the skirt members 241a and 241b by means of self-tapping screws, which are threaded upwardly through apertures 263 formed in the forward portions of the skirt members 241a and 241b (see FIG. 19) and which are threaded up into bosses 271 that are internally molded in the interior portion of the snow guard 238, as illustrated in FIG. 20. The bosses 271 are located within the confines of the snow guard 238 approximately at the location of points A in FIG. 17.

Figure 22:
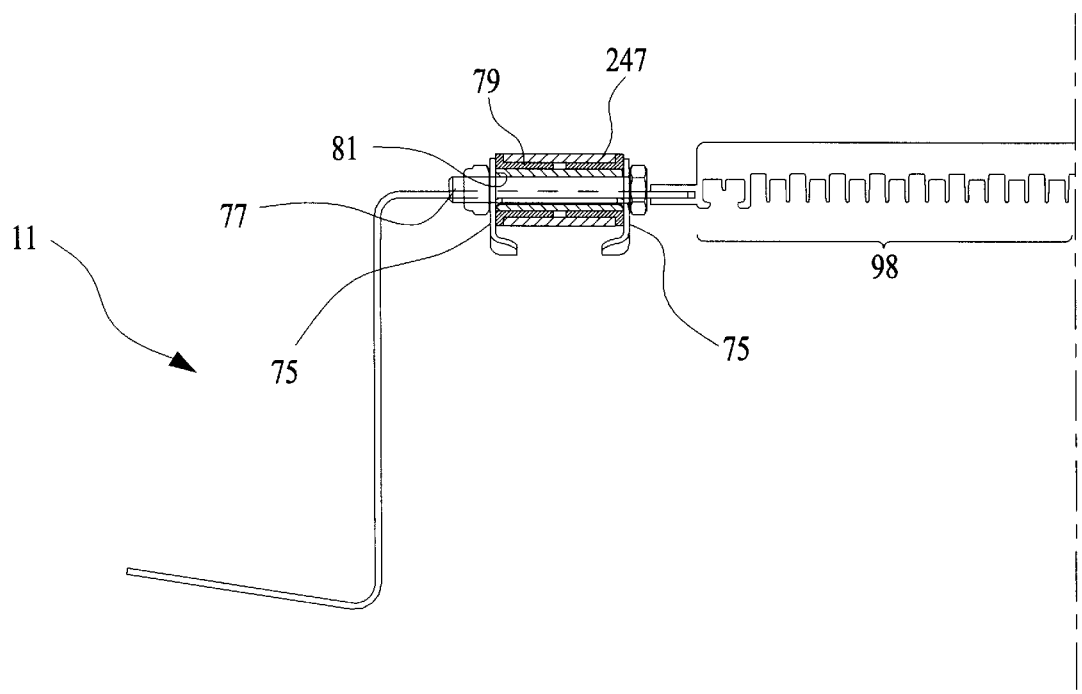
FIG. 22 is a half-section view taken along line 22—22 in FIG. 20.

As illustrated in FIG. 19, a tubular aluminum journaling sleeve 247 is welded to the front end of each rib 245a and 245b. The journaling sleeves 247 fit between lugs 75 extending from the rear of the upper portion of the chassis 11, as shown in FIG. 11 and 22. The pins 77, passing through the journaling sleeves, pivotally connect the flap 236 to the rear of the chassis 11. Bushings 79 and 81 are provided to protect the interior surfaces of the journaling sleeves 247 and the exterior surfaces of the pins 77.

As illustrated in FIG. 19, the forward ends of the skirt members 241a and 241b are "cut back" slightly to provide ample room around the journaling sleeves 247 to insure smooth pivoting of the flap assembly 236. Furthermore, the journaling sleeves 247 fit within a trough- or channel-shaped recess 285 that is formed at and extends along the width of the front portion of the snow guard 238, as illustrated in FIGS. 17, 18, and 20. As shown in FIG. 17, the lugs 75 pass through slots 289, such that the front end of the snow guard 238 is able to fit down over the pivoting surfaces, which enhances safety by covering the pivot points and pivotal surfaces.

As further shown in FIGS. 17 and 18, recesses 291 are formed in the sides of the snow guard 238. As illustrated in FIGS. 20 and 21, the upper ends of the linkage struts 76 are pivotally connected to the flap 236 via pins 88, which pass through apertures formed in the sidewalls of the ribs 245a and 245b. A spacer bushing 293 is provided on the outer-facing side of each rib and keeps the linkage struts 76 properly positioned laterally. The spacer bushings 293 and the bushings 295 positioned within the apertures in the upper ends of the linkage struts 76 permit a slight amount of side-to-side rotation of the linkage struts relative to the pins 88, such that the assembly is able to tolerate lateral movement. The upper ends of the linkage struts 76 fit within the recesses 291, and there is sufficient clearance to permit the full range of rotation of the linkage struts 76 relative to the flap 236 as the flap 236 pivots relative to the chassis 11 as illustrated in FIGS. 9 and 10.

Figure 15:
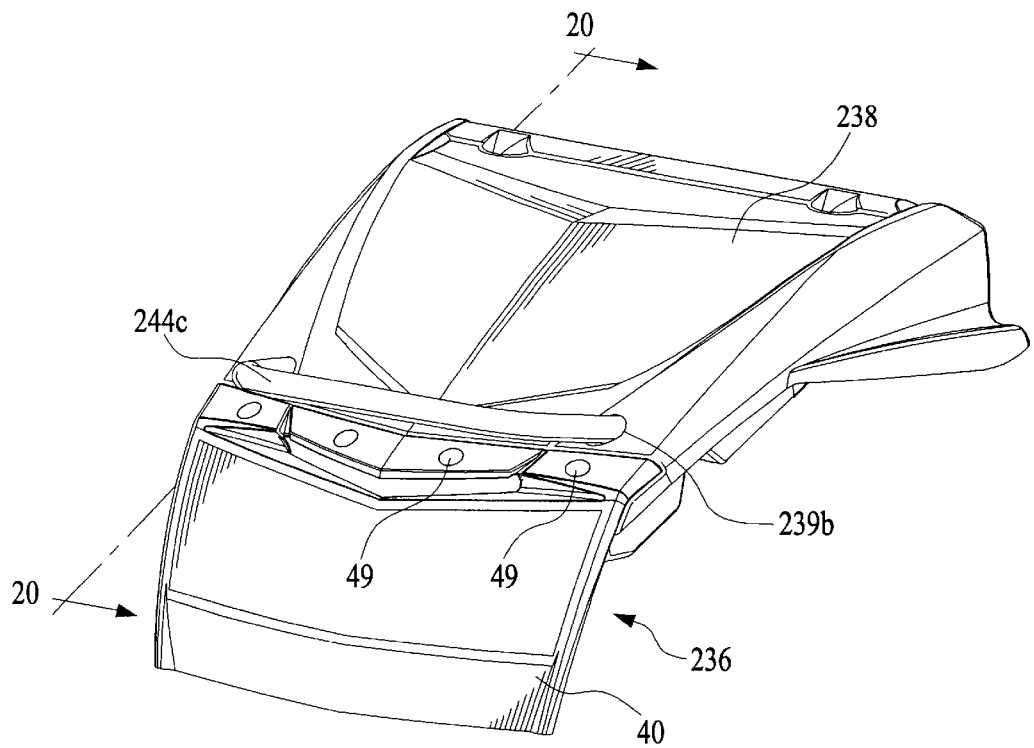
FIGS. 15–18 are rear three-quarter, side, bottom, and bottom, rear, three-quarter perspective views of a preferred embodiment of a pivotable snow flap according to the invention.

As illustrated in FIGS. 15 and 20, the snow deflector 40 is attached to the trailing edge 243 of the snow guard 238, e.g., by rivets 99, which may be located within pockets or small wells 47 formed at the forward edge of the snow deflector 40. Screw-on tops 49 are used to cover the wells 47. The snow deflector 40 is made from hard rubber or SynPrene (IT481), which is a thermoplastic elastomer designed for long-term outdoor usage and available from Synergistics.

Another configuration of the snow flap 336 is illustrated in FIGS. 23A and 23B. In this embodiment, the skirt member 341 is formed from extruded aluminum or sheet metal which is bent to form the downwardly extending skirt flanges 342 as well as trailing edge 343 to which the snow deflector 40 is attached by means of leading edge flange portion 40'. Forward pivotal connection journaling sleeves 348 are supported by stand-offs 350, which are fastened (e.g., bolted or riveted) at the forward end of the skirt member 341. The journaling sleeves 348 are used to pivotally connect the snow flap 336 to the rear of the chassis 11 in the same manner as the configurations described above. A second pair of rear journaling sleeves 352 are supported by stand-offs 354, which are fastened to a rear portion of the upper surface of the skirt member 341 in the same manner as the forward stand-offs 350.

The snow deflector 40 is secured to the skirt member 341 by attachment of the leading edge flange portion 40' to the trailing edge 343 of the skirt member 341, as described above. The bumper 344 is securely attached to the upper surface of the skirt member 341, with the forward ends of the arms 344a and 344b secured between the stand-offs 354 as shown. The snow guard 338 is secured to the skirt member 341 in this embodiment in the same fashion as in the embodiment shown in FIGS. 13A and 13B, with cutouts 339a and 339b fitting over the bumper arms 344a and 344b.

Finally, in another embodiment shown in FIGS. 24A and 24B, the snow flap 436 has an integral snow guard/bumper/skirt unit to which the snow deflector 40 is attached, as described above. The integral unit 436 has an upper snow guard portion 438 and integral, depending skirt flanges 442, similarly to the embodiment illustrated in FIGS. 14A and 14B. Unlike that embodiment, the bumper 444 is also integrally molded into the unit, with stiffening "arm" portions 444a and 444b extending along the undersurface of the snow guard portion 438 and the handle portion 444c of the bumper 244 adjoining on the upper or dorsal surface of the snow guard 438. Such configuration can be manufactured by, for example, blow molding thermoplastic resin or by using other conventional molding or shaping operations.

It will be appreciated that the above-described embodiments are intended to illustrate the invention and that various modifications to and departures therefrom will occur to those having skill in the art. Any and all such modifications are deemed to be within the scope of the following claims.

We claim:
1. A snowmobile, comprising:
   a chassis;
   a handlebar disposed on said chassis;

a ski support system mounted at a forward portion of said chassis and including at least two skis operatively connected to said handelebar to provide steering control of said snowmobile;

a propulsion-providing track system having an endless track, said track system being movably mounted under a rear portion of said chassis and configured to move through a range of travel with respect to said chassis; and a snow flap disposed above said track system, said snow flap being connected to said track system and pivotally connected to said rear portion of said chassis so as to pivot relative to said chassis, moving with said track system as said track system moves through said range of travel, wherein said snow flap comprises a handle-forming bumper member extending rearwardly from a rear portion of said snow flap and wherein said snow flap is pivotally connected to said rear portion of said chassis by a forward portion of said handle-forming bumper member.

2. The snowmobile of claim 1, wherein said handle-forming bumper member is generally U-shaped and wherein said forward portion of said handle-forming bumper member comprises arms of said U-shaped bumper member.

3. The snowmobile of claim 1, wherein said snow flap is connected to said track system by linkage struts pivotally connected to said snow flap via said handle-forming bumper member.

4. The snowmobile of claim 1, wherein said snow flap comprises an upper snow guard portion attached to a top of said bumper member.

5. The snowmobile of claim 4, wherein said upper snow guard portion has skirt members depending from sides thereof.

6. A snowmobile, comprising:

a chassis;

a handlebar disposed on said chassis;

a ski support system mounted at a forward portion of said chassis and inluding at least two skis operatively connected to said handlebar to provide steering control of said snowmobile;

a propulsion-providing track system having an endless track, said track system being movably mounted under a rear portion of said chassis and configured to move through a range of travel with respect to said chassis; and a snow flap disposed above said track system, said snow flap being connected to said track system and pivotally connected to said rear portion of said chassis so as to pivot relative to said chassis, moving with said track system as said track system moves through said range of travel, wherein said snow flap comprises an upper snow guard attached to a skirt member and a bumper member attached to and extending rearwardly from said skirt member, and wherein said snow flap is pivotally connected to said rear portion of said chassis by a forward portion of said skirt member.

7. The snowmobile of claim 6, wherein said snow flap comprises a handle-shaped bumper member and said bumper member is generally U-shaped; arms of said bumper member pass through a rear portion of said upper snow guard and are secured to said skirt member, said skirt member is comprised of left and right skirt member elements attached to bottoms of said arms; said snow flap being pivotally connected to said rear portion of said chassis by forward ends of said left and right skirt member elements.

8. The snowmobile of claim 7, wherein said left and right skirt member elements each have longitudinally extending ribs formed thereon and wherein said snow flap is connected to said track system by linkage struts pivotally connected to said snow flap via said longitudinally extending ribs.

9. The snowmobile of claim 6, wherein said snow flap comprises a handle-shaped bumper member and said bumper member is generally U-shaped; said skirt member comprises a channel-shaped member extending from front to back of said snow flap; arms of said bumper member are secured to a top surface of said skirt member; said upper snow guard overlies said arms and is attached to the top surface of said skirt member; and said skirt member is pivotally connected to said rear portion of said chassis by first pivotal connection members located at a forward portion of said skirt member.

10. The snowmobile of claim 9, wherein second pivotal connection members are located at a rear portion of said skirt member and wherein said snow flap is connected to said track system by linkage struts pivotally connected to said snow flap via said second pivotal connection members.

11. The snowmobile of claim 8, wherein each rib includes a protector member.

* * * * *